US012631793B2

(12) United States Patent
    Fan et al.

(10) Patent No.: US 12,631,793 B2
(45) Date of Patent: May 19, 2026

(54) ELECTRONIC DEVICE

(71) Applicant: LARGAN PRECISION CO., LTD.,
    Taichung City (TW)

(72) Inventors: Chen-Wei Fan, Taichung City (TW);
    Chi-Wei Chi, Taichung City (TW);
    Wei-Fong Hong, Taichung City (TW);
    Ssu-Hsin Liu, Taichung City (TW)

(73) Assignee: LARGAN PRECISION CO., LTD.,
    Taichung City (TW)

( * ) Notice: Subject to any disclaimer, the term of this
    patent is extended or adjusted under 35
    U.S.C. 154(b) by 404 days.

(21) Appl. No.: 18/316,663

(22) Filed: May 12, 2023

(65) Prior Publication Data

US 2023/0384486 A1    Nov. 30, 2023

Related U.S. Application Data

(60) Provisional application No. 63/345,984, filed on May
    26, 2022.

(51) Int. Cl.
    *G02B 1/115*        (2015.01)
    *G02B 27/01*           (2006.01)

(52) U.S. Cl.
    CPC .......... *G02B 1/115* (2013.01); *G02B 27/0172*
    (2013.01); *G02B 2207/101* (2013.01)

(58) Field of Classification Search
    CPC ............... G02B 1/115; G02B 27/0172; G02B
    2207/101; G02B 27/0018; G02B 1/118;

G02B 1/14; G02B 1/113; G02B 27/00;
G03B 30/00; B82Y 20/00; B82Y 30/00;
H04M 1/026; H04M 1/0264
See application file for complete search history.

(56) References Cited

U.S. PATENT DOCUMENTS

| | | | |
|---|---|---|---|
| 9,420,155 B2 | 8/2016 | Brodie | |
| 10,139,532 B2 | 11/2018 | Ye et al. | |
| 10,591,645 B2 | 3/2020 | Ge | |
| 10,830,930 B1 | 11/2020 | Roschuk | |
| 10,890,700 B2 | 1/2021 | Cool | |
| 11,269,210 B2 | 3/2022 | Liu | |
| 2002/0018276 A1* | 2/2002 | Suga ................. | G02B 23/2407 |
| | | | 359/212.1 |
| 2006/0199040 A1 | 9/2006 | Yamada et al. | |

(Continued)

FOREIGN PATENT DOCUMENTS

| | | |
|---|---|---|
| KR | 20170000679 A | 1/2017 |
| WO | 2017015801 A1 | 2/2017 |

*Primary Examiner* — Balram T Parbadia
(74) *Attorney, Agent, or Firm* — McClure, Qualey &
Rodack, LLP

(57) ABSTRACT

An electronic device includes a transparent element, an
optical component and an anti-reflecting layer. The trans-
parent element is configured to separate an inner side and an
outer side of the electronic device, so that a light passes
through the transparent element to enter or leave the elec-
tronic device, and the transparent element includes an inner
side surface and an outer side surface. The inner side surface
faces towards the inner side, and the outer side surface faces
towards the outer side. The optical component is corre-
sponding to the inner side surface of the transparent element.
The anti-reflecting layer is disposed on at least one portion
of the inner side surface of the transparent element.

17 Claims, 23 Drawing Sheets

(56) References Cited

U.S. PATENT DOCUMENTS

| | | | |
|---|---|---|---|
| 2008/0002259 A1* | 1/2008 | Ishizawa | G02B 1/118 |
| | | | 359/581 |
| 2010/0259823 A1 | 10/2010 | Xi | |
| 2012/0212827 A1 | 8/2012 | Kakegawa | |
| 2016/0061998 A1 | 3/2016 | Sakai et al. | |
| 2016/0373627 A1* | 12/2016 | Rasmussen | G02B 3/00 |
| 2018/0024274 A1 | 1/2018 | Rogers | |
| 2018/0100957 A1 | 4/2018 | Ye et al. | |
| 2022/0086266 A1* | 3/2022 | Zhang | G06T 7/55 |

* cited by examiner

10

130

110

112

121

L

110

<u>110</u>

<u>113</u>

320

30

330
350
313
310

31

40

430

50

530

530

ELECTRONIC DEVICE

RELATED APPLICATIONS

This application claims priority to U.S. Provisional Application Ser. No. 63/345,984 filed May 26, 2022, which is herein incorporated by reference.

BACKGROUND

Technical Field

The present disclosure relates to an electronic device. More particularly, the present disclosure relates to a portable electronic device.

Description of Related Art

In recent years, portable electronic devices have developed rapidly. For example, intelligent electronic devices, head-mounted devices and video capturing devices have been filled in the lives of modern people. However, as technology advances, the quality requirements of the electronic device are becoming higher and higher.

FIG. 7 is a schematic view of a light L traveling through the optical component 720 according to the prior art. In FIG. 7, the light L easily reflects between a transparent element 710 and the optical component 720, and hence the stray light is easily formed on the imaging surface of the electronic device according to the prior art so as to influence the functional performance of the optical component. Therefore, an electronic device, which can reduce the reflection of the light between transparent element and the optical component, needs to be developed.

SUMMARY

According to one aspect of the present disclosure, an electronic device includes a transparent element, an optical component and an anti-reflecting layer. The transparent element is configured to separate an inner side and an outer side of the electronic device, so that a light passes through the transparent element to enter or leave the electronic device, and the transparent element includes an inner side surface and an outer side surface. The inner side surface faces towards the inner side, and the outer side surface faces towards the outer side. The optical component is corresponding to the inner side surface of the transparent element. The anti-reflecting layer is disposed on at least one portion of the inner side surface of the transparent element.

DETAILED DESCRIPTION

Figure 1A:
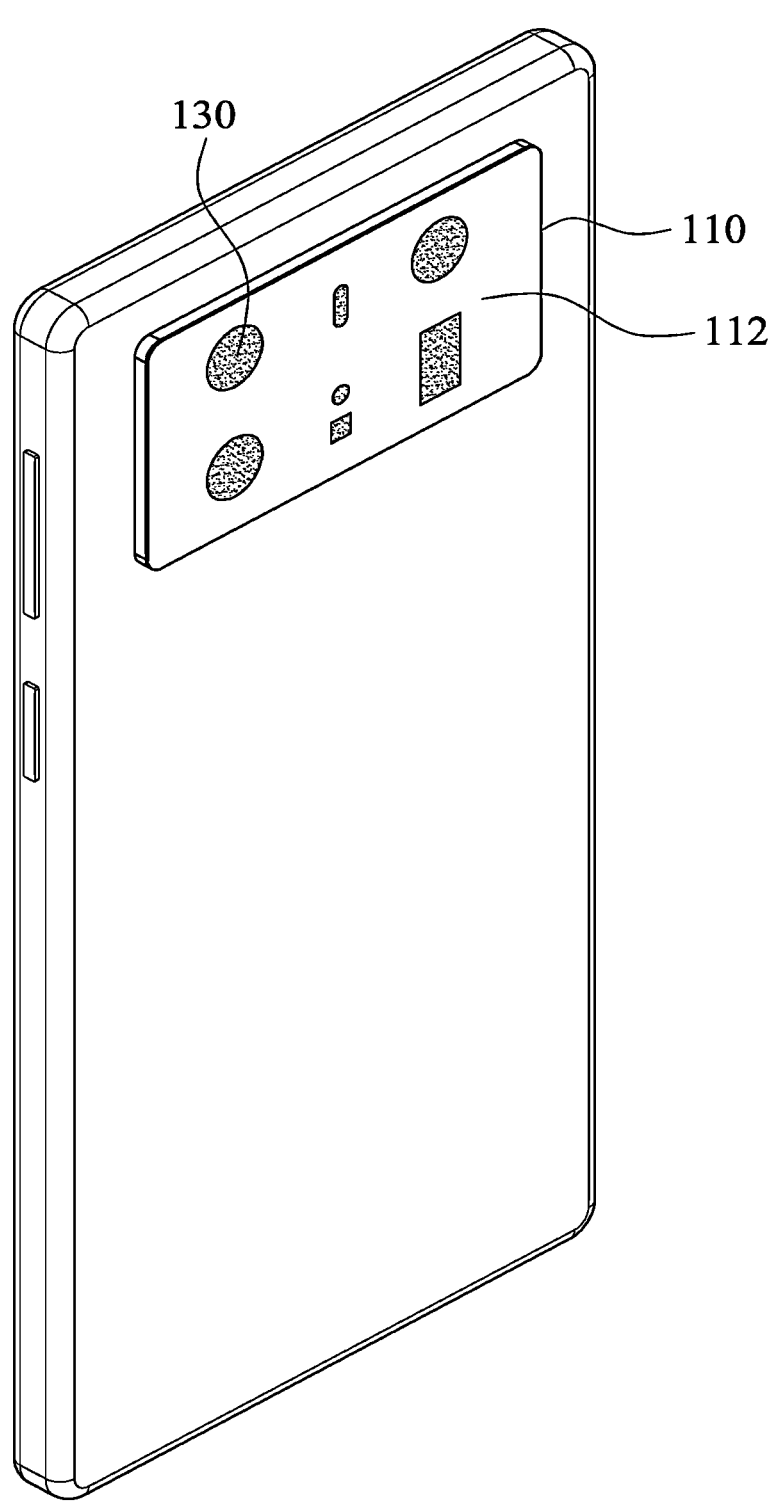
FIG. 1A is a three dimensional view of an electronic device according to the 1st example of the present disclosure.

The present disclosure provides an electronic device, which includes a transparent element, an optical component and an anti-reflecting layer. The transparent element is configured to separate an inner side and an outer side of the electronic device, so that a light passes through the transparent element to enter or leave the electronic device, and the transparent element includes an inner side surface and an outer side surface, wherein the inner side surface faces towards the inner side, and the outer side surface faces towards the outer side. The optical component is corresponding to the inner side surface of the transparent element. The anti-reflecting layer is disposed on at least one portion of the inner side surface of the transparent element. Hence, the reflection of the stray light between the transparent element and the optical component can be avoided by disposing the anti-reflecting layer on the inner side surface of the transparent element so as to enhance the image quality.

The anti-reflecting layer can include a nanostructure layer, wherein the nanostructure layer includes a plurality of ridge-like protrusions, the ridge-like protrusions extend non-directionally from a disposing surface, a bottom of each of the ridge-like protrusions is closer to the disposing surface than a top of each of the ridge-like protrusions to the disposing surface, and each of the ridge-like protrusions is tapered from the bottom towards the top. Moreover, the nanostructure layer can include an aluminum oxide. Further, when the cross section of the light blocking element is observed, the nano-ridged protrusions have the shape of wide bottom and narrow top like a mountain ridge so as to gradually decrease the equivalent refractive index of the nanostructure layer from the bottom (that is, the foot of the mountain) to the top (that is, the top of the mountain) for avoiding the light reflecting totally on the interface, and the rough surface can be formed so as to reduce the reflection of the light.

The anti-reflecting layer can further include a structure connection film, wherein the structure connection film includes at least one silicon dioxide layer, and a top of the silicon dioxide layer is directly contacted with a bottom of the nanostructure layer. Therefore, the connecting stability of the nanostructure layer can be enhanced, so that the nanostructure layer can be stably attached on different materials.

A partial area of the top of the silicon dioxide layer can be contacted with an air. In particular, the nanostructure layer has a plurality of tiny pores so as to modulate the equivalent refractive index of the nanostructure layer.

The outer side surface can include an anti-scratch layer. Therefore, the scratch can be avoided forming on the outer side surface of the transparent element so as to avoid influencing the operation of the optical component.

The optical component can be an imaging camera, and the anti-reflecting layer can be further disposed on the optical component, so that the reflection of the light between the elements on the inner side of the electronic device can be further reduced to enhance the image quality. Moreover, the elements disposed on the imaging camera can be a lens barrel or a lens element, but the present disclosure is not limited thereto.

The transparent element can further include a light blocking structure, wherein a light-transmitting area is remained on the transparent element via the light blocking structure, and the light-transmitting area is corresponding to the optical component. In particular, the light blocking structure is configured to avoid the light passing through, and the light blocking structure can be the black ink spraying layer formed via the quick drying ink based on the epoxy resin, the blackened coating layer via the chemical vaper deposition, the photoresistive coating layer or the light blocking sheet composed of the black polyethylene terephthalate (PET) material, but the present disclosure is not limited thereto.

A number of the transparent element can be at least two, a number of the optical component can be at least two, and each of the transparent elements is corresponding to each of the optical components. By each of the transparent elements corresponding to each of the optical components, the anti-reflecting layer can be adjusted according to the requirement of the optical components.

The inner side surface of one of the transparent elements can be non-planar. Therefore, the reflecting path of the light can be changed, or the transparent element can have the refractive power.

A number of the optical component can be at least two, and the optical components are corresponding to the inner side surface of the transparent element. By the single transparent element corresponding to a plurality of optical components, the transparent element is only required to be coated once for corresponding to the optical components with different working wavelengths so as to simplify the manufacturing process.

One of the optical components can be an imaging camera, and the other one of the optical components can be a light-emitting element, wherein the light-emitting element can be an infrared light-emitting element for the purpose such as the space recognition and the distance measurement. Or, the light-emitting element can be a flash element for the purpose such as the light-filling and the illumination, and the working wavelength of the flash module is between 400 nm and 700 nm corresponding to the wavelength range of the visible light.

The optical components can be at least two imaging cameras, wherein a field of view of one of the imaging cameras is different from a field of view of the other one of the imaging cameras, and a corresponding working wavelength of one of the optical components is different from a corresponding working wavelength of the other one of the optical components. In particular, the imaging cameras can be an ultra-long-focal telephoto imaging camera, a long-focal portrait imaging camera, a wide-angle imaging camera, a ultra-wide-angle imaging camera or a TOF (Time-Of-Flight) camera module, wherein a field of view of the ultra-long-focal telephoto imaging camera is between about 20 degrees and 30 degrees, a working wavelength of the ultra-long-focal telephoto imaging camera is between 400 nm and 700 nm corresponding to the wavelength range of the visible light; a field of view of the long-focal portrait imaging camera is about 50 degrees, a working wavelength of the long-focal portrait imaging camera is between 400 nm and 700 nm corresponding to the wavelength range of the visible light; a field of view of the wide-angle imaging camera is about 90 degrees, a working wavelength of the wide-angle imaging camera is between 400 nm and 700 nm corresponding to the wavelength range of the visible light; a field of view of the ultra-wide-angle imaging camera is about 130 degrees, a working wavelength of the ultra-wide-angle imaging camera is between 400 nm and 700 nm corresponding to the wavelength range of the visible light; a working wavelength of the TOF camera module is between 800 nm and 1100 nm corresponding to the wavelength range of the infrared light.

The electronic device can be a portable electronic device.

When an average reflectivity of at least one portion of the inner side surface of the transparent element corresponding to a light with a wavelength range between 400 nm and 700 nm is $R_{4070}$, the following condition can be satisfied: $R_{4070} \leq 0.5\%$.

When an average reflectivity of at least one portion of the inner side surface of the transparent element corresponding to a light with a wavelength range between 750 nm and 900 nm is $R_{7590}$, the following condition can be satisfied: $R_{7590} \leq 0.65\%$. In particular, the low reflectivity can be simultaneously maintained during the wavelength range of the visible light and the wavelength range of the infrared light by the anti-reflecting layer based on the graded refractive index in contrast to the anti-reflecting layer based on the interference principle of the thin film. Therefore, the reflection of the stray light can be reduced by maintaining the low reflectivity during the wavelength range of the visible light and the wavelength range of the infrared light to enhance the image quality of the imaging camera, and the infrared light component (such as the TOF camera) with the sufficient penetration of the infrared light can be provided so as to avoid influencing the function of the infrared light component.

An average structural height of the nanostructure layer can be larger than or equal to 70 nm and less than or equal to 350 nm. It should be mentioned that the average height is calculated by the structural heights of at least three or more ridge-like protrusions from the nanostructure layer, wherein the destructive measurement is to measure the vertical height from the absolute bottom (that is, the foot of the mountain) of the ridge-like protrusions to the top (that is, the top of the mountain) of the ridge-like protrusions during the observation of the structural height of the nanostructure layer from the cross section. Or, the non-destructive measurement is to measure the vertical height from the relative bottom (that is, the portion of the valley between two mountains) of the ridge-like protrusions to the top (that is, the top of the mountain) of the ridge-like protrusions during the observation of the structural height of the nanostructure layer from the outer surface.

When a spacing distance between the inner side surface and the optical component is D, the following condition can be satisfied: D≤5 mm. When the spacing distance satisfied the aforementioned condition, the light is not easily reflected between the transparent element and the optical component, and the light cannot enter into the optical component again so as to avoid influencing the image quality.

Each of the aforementioned features of the electronic device can be utilized in various combinations for achieving the corresponding effects.

According to the aforementioned embodiment, specific examples are provided, and illustrated via figures.

1st Example

Figure 1B:
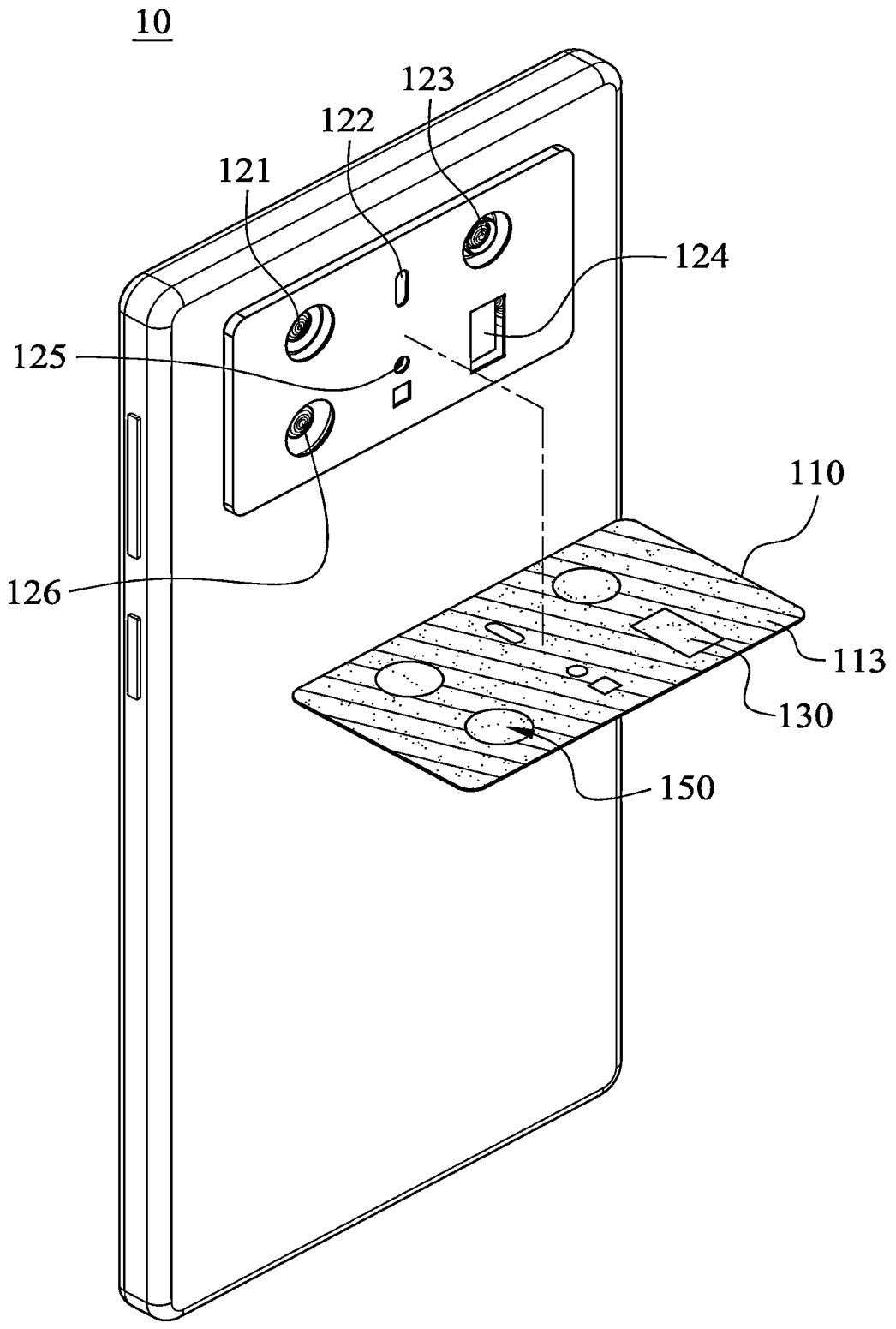
FIG. 1B is a partial exploded view of the electronic device according to the 1st example in FIG. 1A.
Figure 1C:
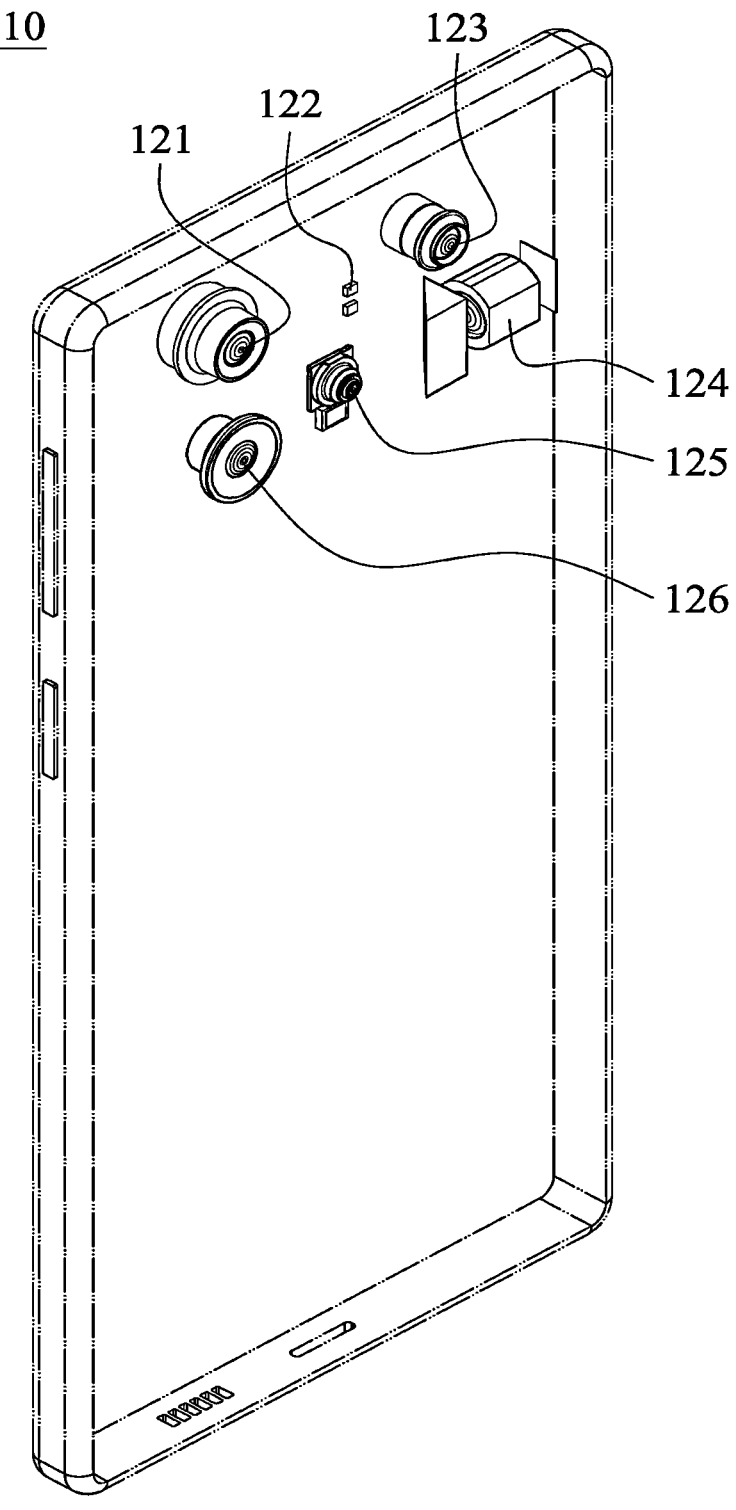
FIG. 1C is a partial perspective view of the electronic device according to the 1st example in FIG. 1A.
Figure 1D:
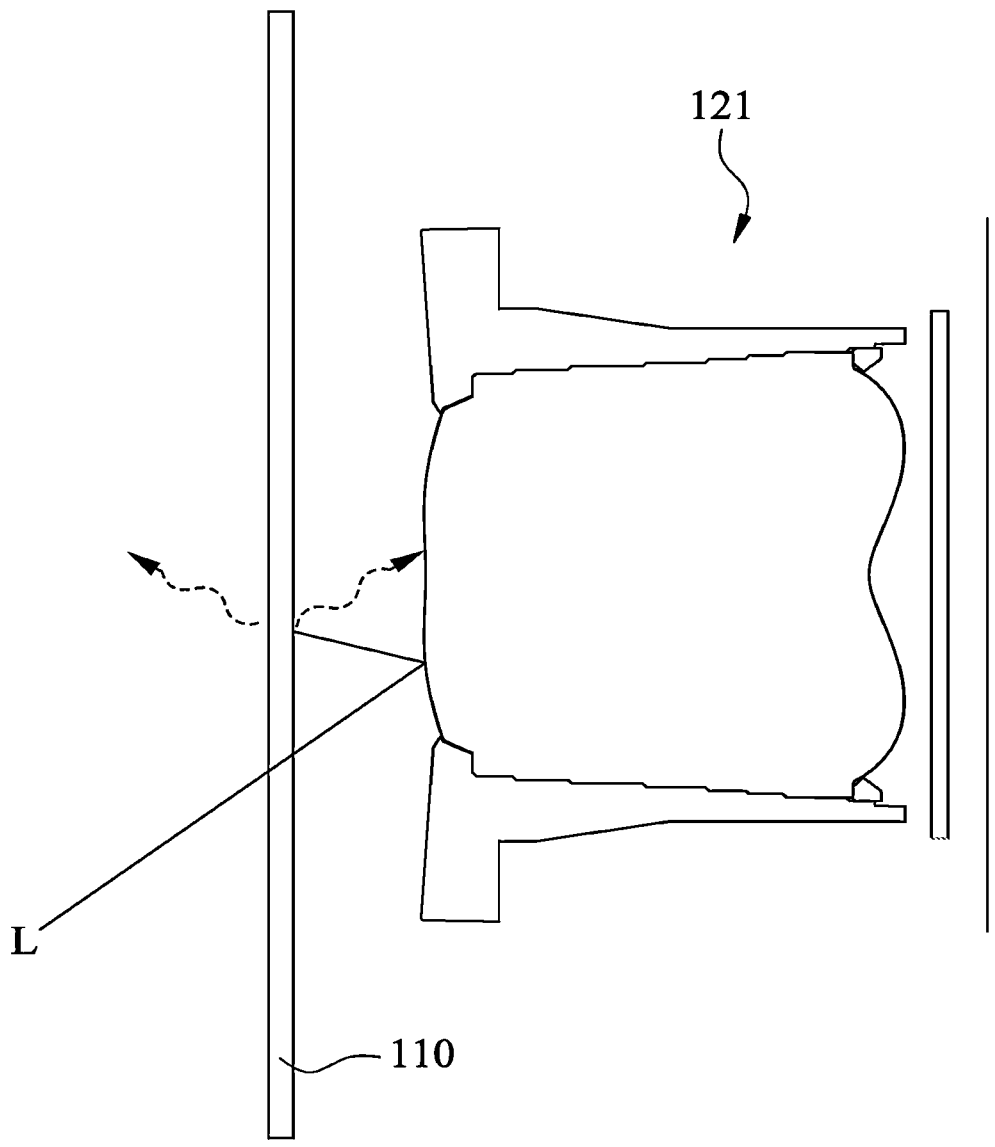
FIG. 1D is a schematic view of a light traveling through the optical component according to the 1st example in FIG. 1A.
Figure 1E:
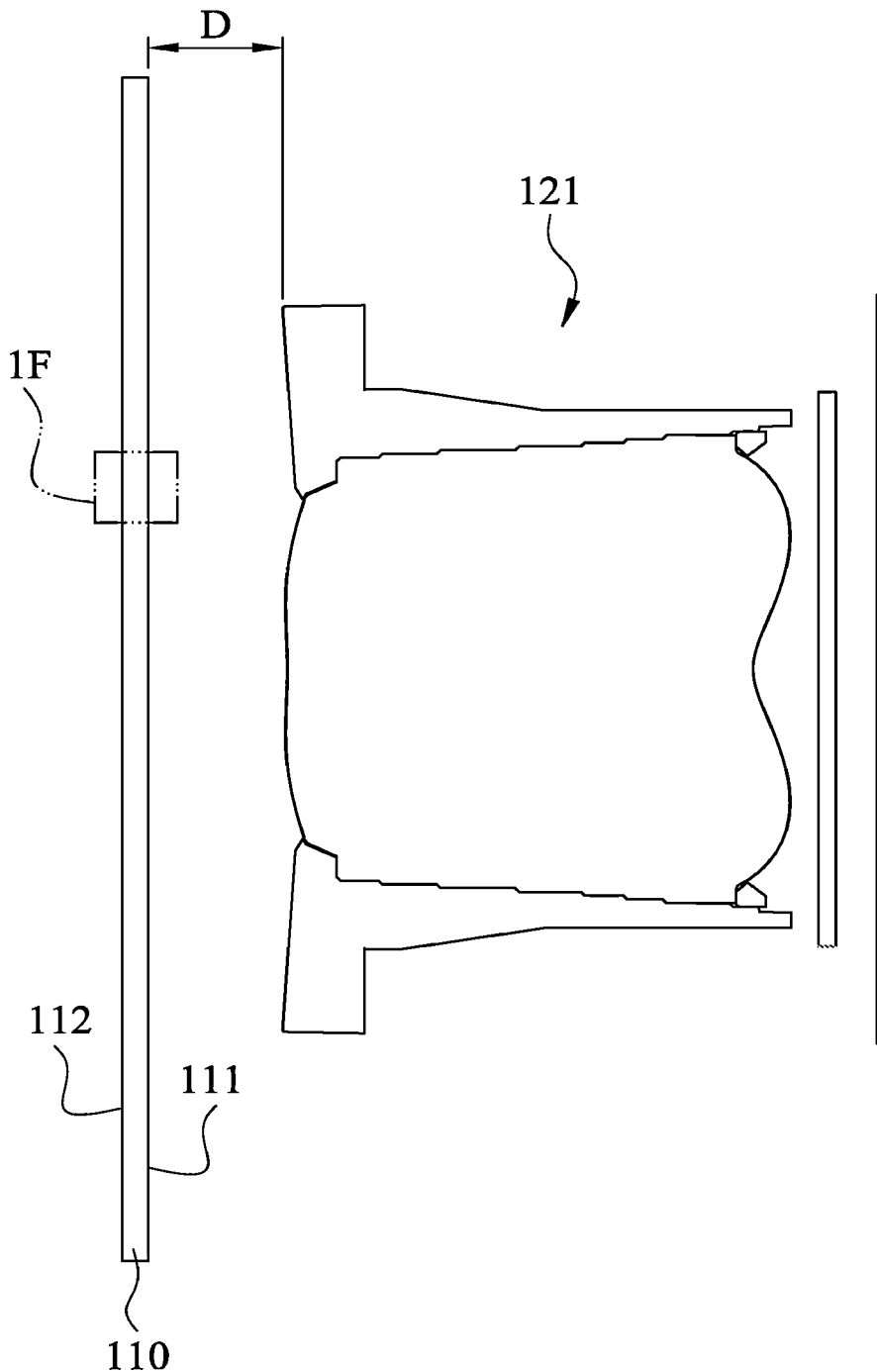
FIG. 1E is a schematic view of the transparent element and the optical component according to the 1st example in FIG. 1A.

FIG. 1A is a three dimensional view of an electronic device 10 according to the 1st example of the present disclosure. FIG. 1B is a partial exploded view of the electronic device 10 according to the 1st example in FIG. 1A. FIG. 1C is a partial perspective view of the electronic device 10 according to the 1st example in FIG. 1A. FIG. 1D is a schematic view of a light L traveling through the optical component 121 according to the 1st example in FIG. 1A. FIG. 1E is a schematic view of the transparent element 110 and the optical component 121 according to the 1st example in FIG. 1A. In FIGS. 1A to 1E, the electronic device 10 can be a smart electronic device, and the electronic device 10 includes a transparent element 110, a plurality of optical components 121, 122, 123, 124, 125, 126 and an anti-reflecting layer 130, wherein the transparent element 110 is configured to separate an inner side and an outer side of the electronic device 10, so that the light L passes through the transparent element 110 to enter or leave the electronic device 10. It should be mentioned that the traveling path of the light L in FIG. 1D is only configured to be the schematic view rather than limiting the traveling path of the light L.

The optical components 121, 123, 124, 125, 126 are imaging cameras, respectively, and the optical component 122 is a light-emitting element, wherein a field of view of one of the imaging cameras is different from a field of view of another one of the imaging cameras. Moreover, the optical component 121 is a wide-angle imaging camera, the optical component 122 is a flash module, the optical component 123 is a long-focal portrait imaging camera, the optical component 124 is an ultra-long-focal telephoto imaging camera, the optical component 125 is a TOF camera module, and the optical component 126 is a ultra-wide-angle imaging camera, wherein the TOF camera module can include a transmitting end and a receiving end. In detail, a field of view of the optical component 121 is about 90 degrees, a working wavelength of the optical component 121 is between 400 nm and 700 nm corresponding to the wavelength range of the visible light; a working wavelength of the optical component 122 is between 400 nm and 700 nm corresponding to the wavelength range of the visible light; a field of view of the optical component 123 is about 50 degrees, a working wavelength of the optical component 123 is between 400 nm and 700 nm corresponding to the wavelength range of the visible light; a field of view of the optical component 124 is between about 20 degrees and 30 degrees, a working wavelength of the optical component 124 is between 400 nm and 700 nm corresponding to the wavelength range of the visible light; a working wavelength of the optical component 125 is between 800 nm and 1100 nm corresponding to the wavelength range of the infrared light; a field of view of the optical component 126 is about 130 degrees, a working wavelength of the optical component 126 is between 400 nm and 700 nm corresponding to the wavelength range of the visible light.

The transparent element 110 includes an inner side surface 111 (labeled in FIG. 1E) and an outer side surface 112, wherein the inner side surface 111 faces towards the inner side, and the outer side surface 112 faces towards the outer side. Furthermore, the optical components 121, 122, 123, 124, 125, 126 are corresponding to the inner side surface 111 of the transparent element 110, and the anti-reflecting layer 130 is disposed on at least one portion of the inner side surface 111 of the transparent element 110. In particular, the light L is easily reflected between the transparent element 110 and the optical components 121, 122, 123, 124, 125, 126 to influence the functional performance of the optical components 121, 122, 123, 124, 125, 126. Therefore, the reflection of the stray light between the transparent element 110 and the optical components 121, 122, 123, 124, 125, 126 can be avoided by disposing the anti-reflecting layer 130 on the inner side surface 111 of the transparent element 110 so as to enhance the image quality. By the single transparent element 110 corresponding to the optical components 121, 122, 123, 124, 125, 126, the transparent element 110 is only required to be coated once for corresponding to the optical components 121, 122, 123, 124, 125, 126 with different working wavelengths so as to simplify the manufacturing process. Moreover, the anti-reflecting layer 130 can be further disposed on the optical components 121, 122, 123, 124, 125, 126, wherein the anti-reflecting layer 130 can be disposed on the optical components such as a lens barrel and a lens element, so that the reflection of the light between the elements inside the electronic device 10 can be further reduced for enhancing the image quality.

In FIG. 1E, taking the optical component 121 as the example, a spacing distance between the inner side surface 111 and the optical component 121 is D, and the spacing distance D is 1.7 mm.

Figure 1F:
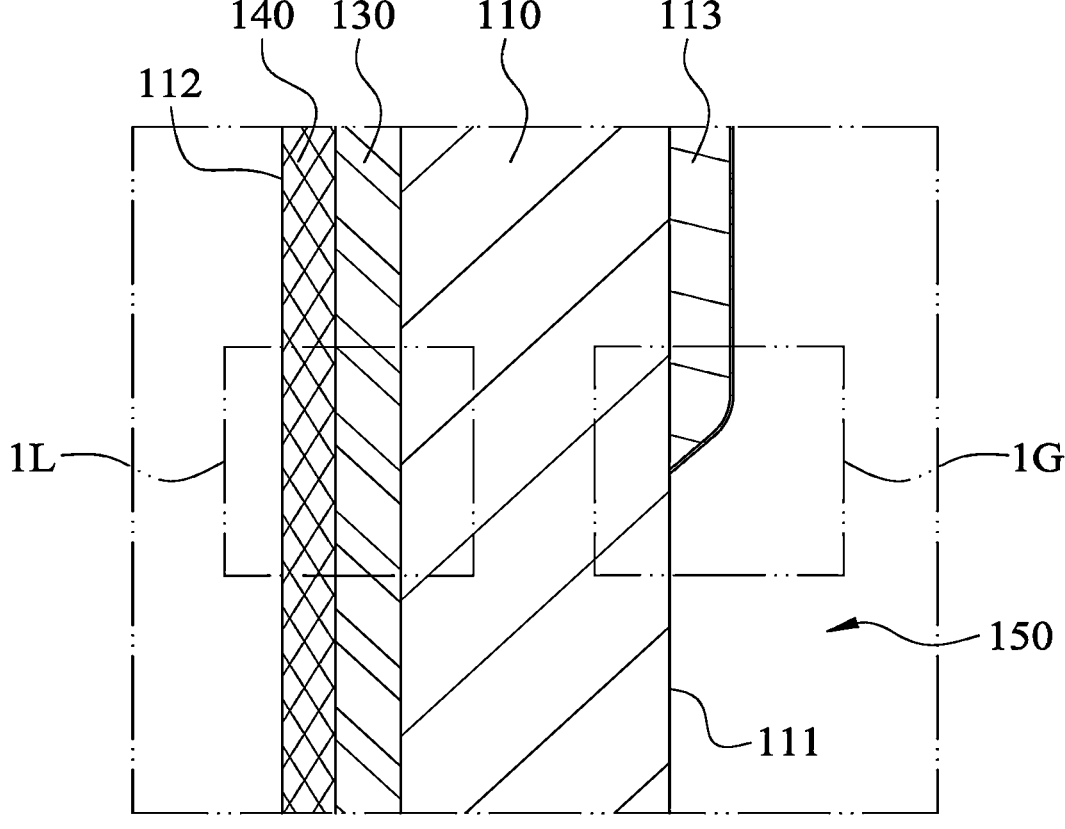
FIG. 1F is a partial enlarged view of the transparent element according to the 1st example in FIG. 1E.
Figure 1G:
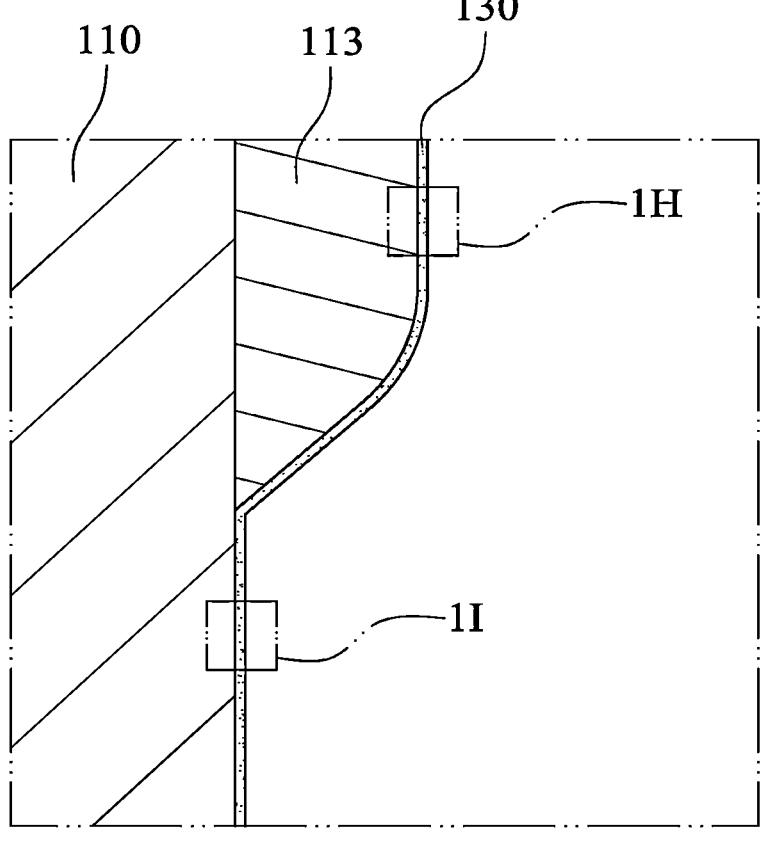
FIG. 1G is a partial enlarged view of the inner side surface of the transparent element according to the 1st example in FIG. 1F.
Figure 1H:
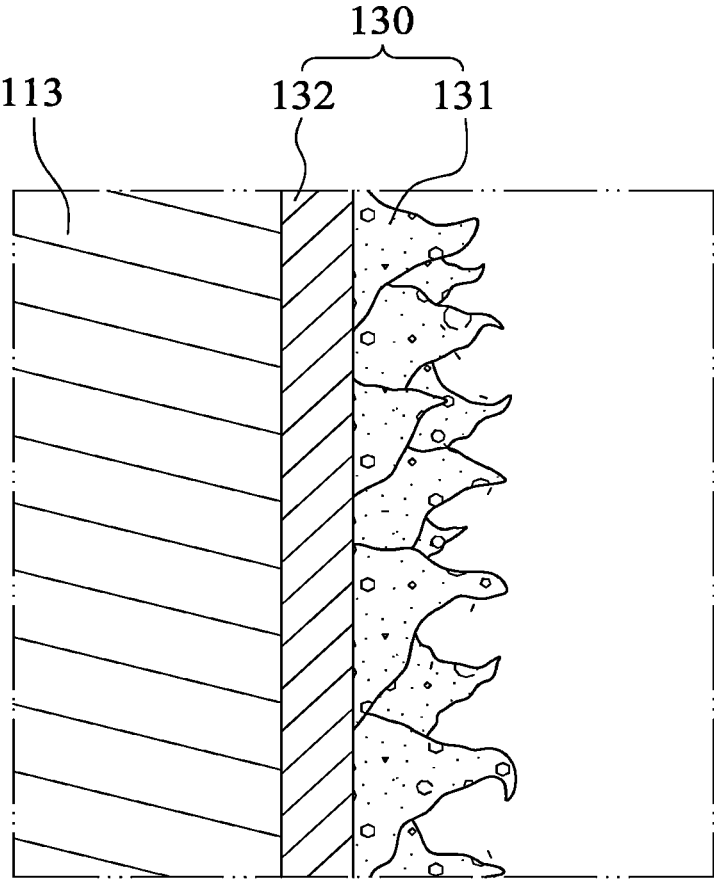
FIG. 1H is an enlarged view of the light blocking structure and the anti-reflecting layer according to the 1st example in FIG. 1G.
Figure 1I:
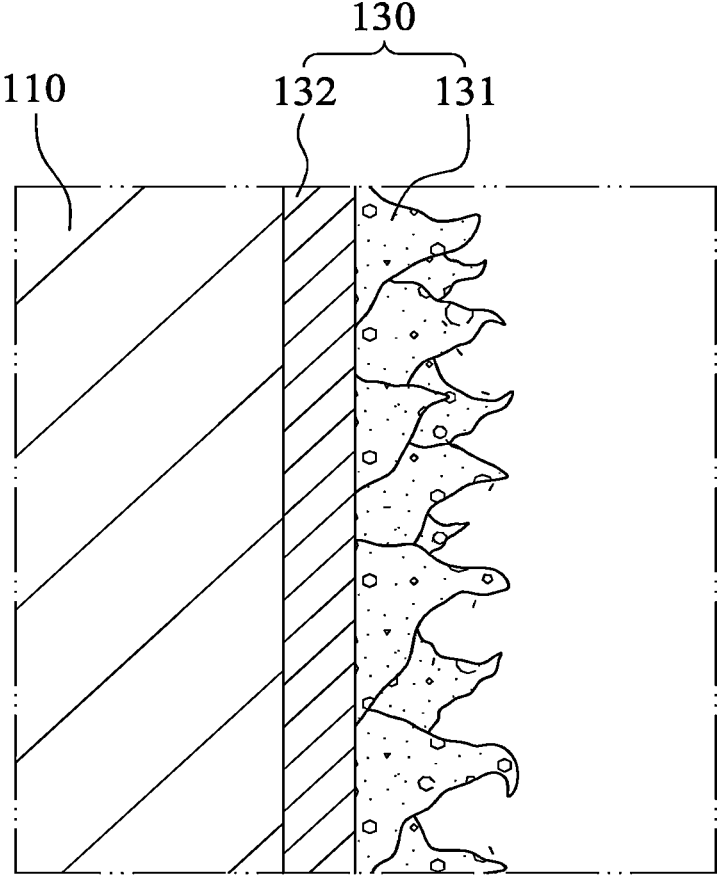
FIG. 1I is an enlarged view of the transparent element and the anti-reflecting layer according to the 1st example in FIG. 1G.
Figure 1J:
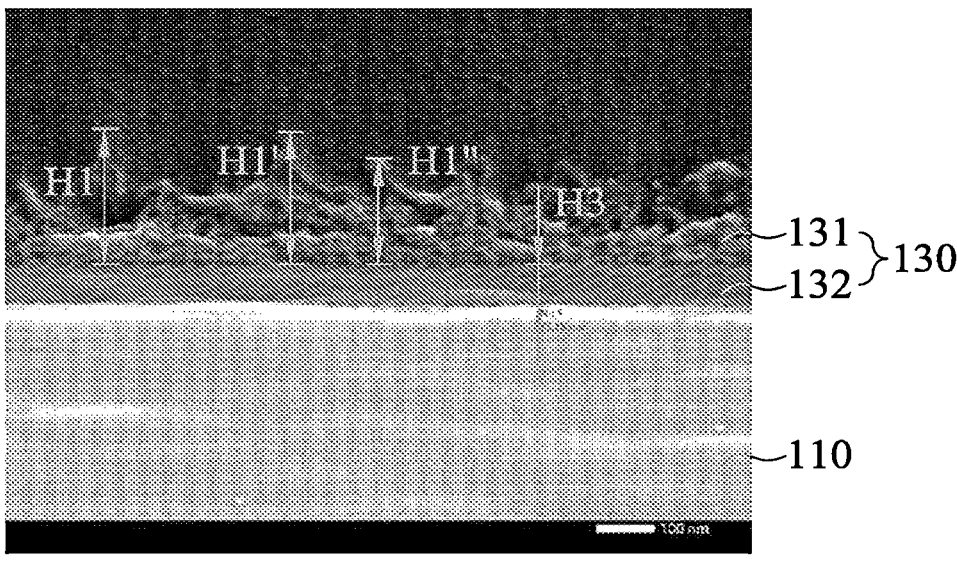
FIG. 1J is a scanning electron microscope image of the transparent element and the anti-reflecting layer according to the 1st example in FIG. 1I.
Figure 1K:
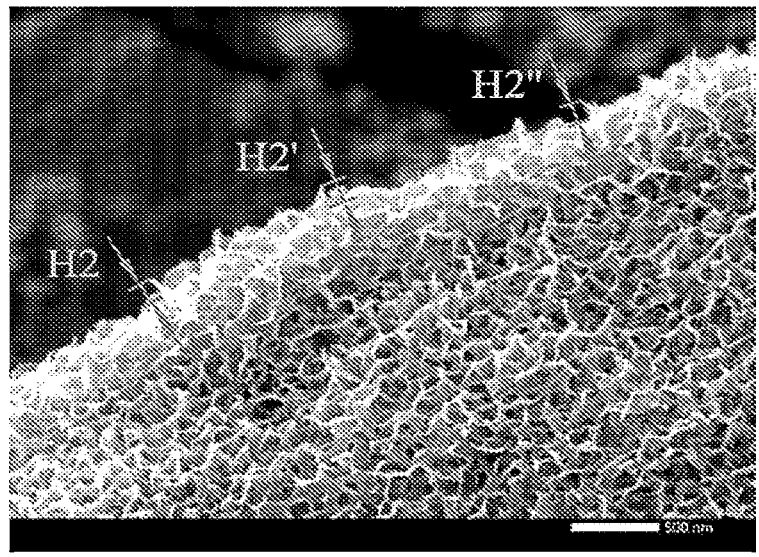
FIG. 1K is a scanning electron microscope image of the nanostructure layer according to the 1st example in FIG. 1I.
Figure 1L:
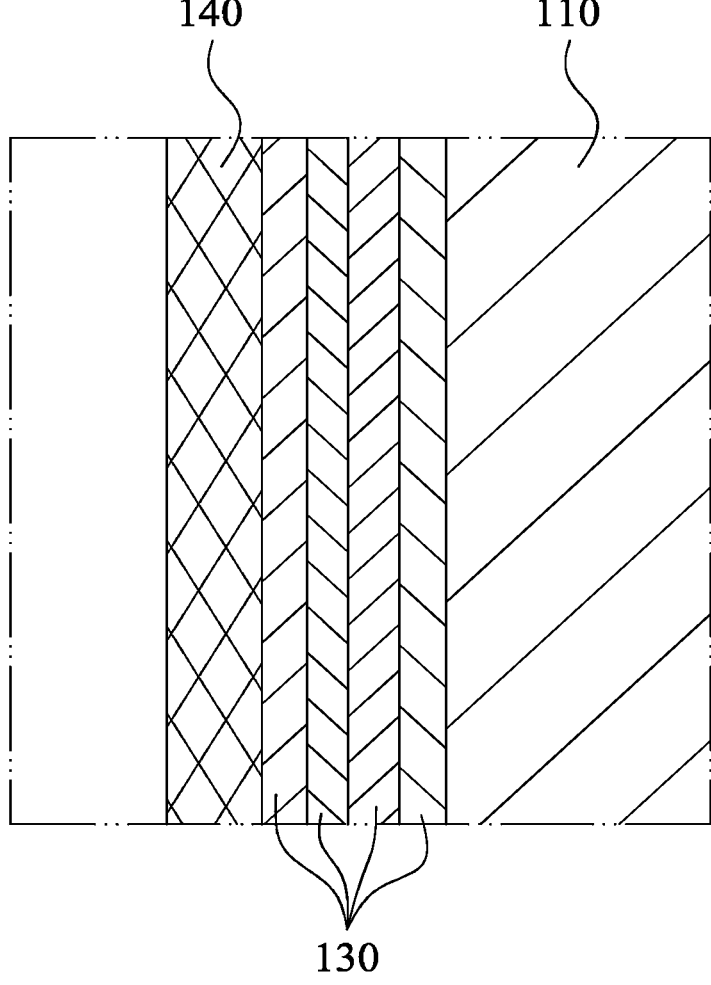
FIG. 1L is a partial enlarged view of the outer side surface of the transparent element according to the 1st example in FIG. 1F.
Figure 1M:
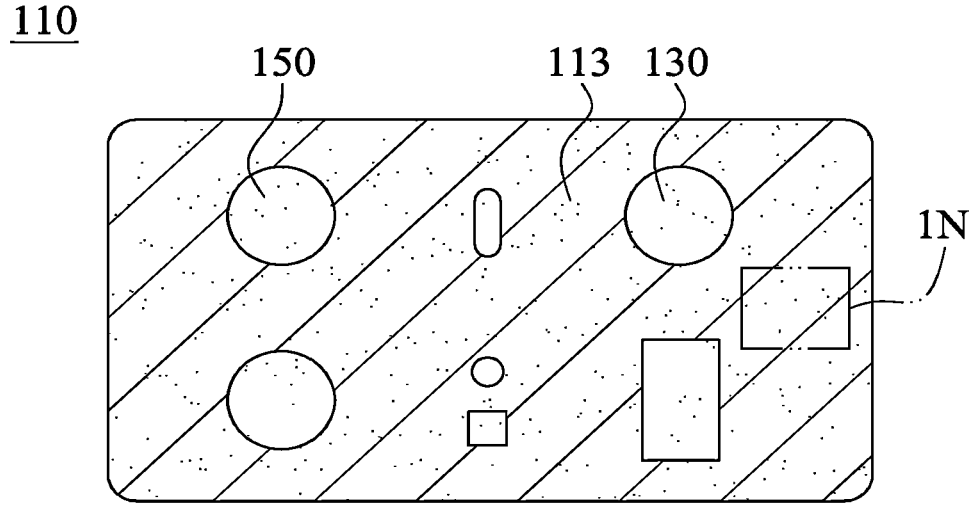
FIG. 1M is a schematic view of the transparent element according to the 1st example in FIG. 1A.
Figure 1N:
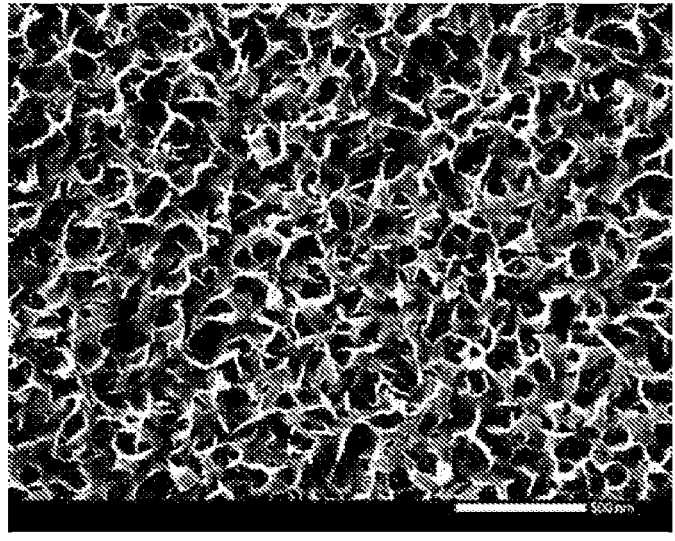
FIG. 1N is a partial scanning electron microscope image of the transparent element according to the 1st example in FIG. 1M.

FIG. 1F is a partial enlarged view of the transparent element 110 according to the 1st example in FIG. 1E. FIG. 1G is a partial enlarged view of the inner side surface 111 of the transparent element 110 according to the 1st example in FIG. 1F. FIG. 1H is an enlarged view of the light blocking structure 113 and the anti-reflecting layer 130 according to the 1st example in FIG. 1G. FIG. 1I is an enlarged view of the transparent element 110 and the anti-reflecting layer 130 according to the 1st example in FIG. 1G. FIG. 1J is a scanning electron microscope image of the transparent element 110 and the anti-reflecting layer 130 according to the 1st example in FIG. 1I. FIG. 1K is a scanning electron microscope image of the nanostructure layer 131 according to the 1st example in FIG. 1I. FIG. 1L is a partial enlarged view of the outer side surface 112 of the transparent element 110 according to the 1st example in FIG. 1F. FIG. 1M is a schematic view of the transparent element 110 according to the 1st example in FIG. 1A. FIG. 1N is a partial scanning electron microscope image of the transparent element 110 according to the 1st example in FIG. 1M. In FIGS. 1F to 1N, the anti-reflecting layer 130 can include a nanostructure layer 131 and a structure connection film 132, the outer side surface 112 can include an anti-scratch layer 140, and the transparent element 110 can further include a light blocking structure 113, wherein the light blocking structure 113 is configured to avoid the light L passing through, a light-transmitting area 150 is remained on the transparent element 110 via the light blocking structure 113, and the light-transmitting area 150 is corresponding to the optical components 121, 122, 123, 124, 125, 126, so that the light L can pass through the transparent element 110 to enter or leave the electronic device 10. Moreover, the portion except the light-transmitting area 150 can be blocked by disposing the light blocking structure 113 on the transparent element 110 so as to reduce the stray light.

In FIGS. 1H to 1K, the nanostructure layer 131 can include a plurality of ridge-like protrusions (their reference numerals are omitted), wherein the ridge-like protrusions extend non-directionally from a disposing surface (its reference numeral is omitted), a bottom of each of the ridge-like protrusions is closer to the disposing surface than a top of each of the ridge-like protrusions to the disposing surface, and each of the ridge-like protrusions is tapered from the bottom towards the top. Moreover, the nanostructure layer 131 can include an aluminum oxide. Further, when the cross section of the transparent element 110 is observed, the nano-ridged protrusions have the shape of wide bottom and narrow top like a mountain ridge so as to gradually decrease the equivalent refractive index of the nanostructure layer 131 from the absolute bottom (that is, the foot of the mountain) to the top (that is, the top of the mountain) for avoiding the light L reflecting totally on the interface, and the rough surface can be formed so as to reduce the reflection of the light L.

In FIG. 1J, the destructive measurement is to measure the vertical height from the absolute bottom of the ridge-like protrusions to the top of the ridge-like protrusions during the observation of the structural height of the nanostructure layer 131 from the cross section, wherein the vertical height H1 of the nanostructure layer 131 is 248.7 nm, the vertical height H1' of the nanostructure layer 131 is 247.4 nm, and the vertical height H1" of the nanostructure layer 131 is 203 nm. By the average of the sum of the vertical heights H1, H1', H1", the average structural height of the nanostructure layer 131 is 233 nm. Further, the vertical height H3 of the structure connection film 132 is 75.15 nm.

In FIG. 1K, the non-destructive measurement is to measure the vertical height from the relative bottom (that is, the portion of the valley between two mountains) of the ridge-like protrusions to the top (that is, the top of the mountain) of the ridge-like protrusions during the observation of the structural height of the nanostructure layer 131 from the outer surface, wherein the vertical height H2 of the nanostructure layer 131 is 143.6 nm, the vertical height H2' of the nanostructure layer 131 is 143.1 nm, the vertical height H2" of the nanostructure layer 131 is 131.5 nm. By the average of the sum of the vertical heights H2, H2', H2", the average structural height of the nanostructure layer 131 is 139.4 nm.

Moreover, the structure connection film 132 includes at least one silicon dioxide layer (its reference numeral is omitted), wherein a top of the silicon dioxide layer is directly contacted with a bottom of the nanostructure layer 131, and a partial area of the top of the silicon dioxide layer is contacted with an air. Therefore, the connecting stability of the nanostructure layer 131 can be enhanced, so that the nanostructure layer 131 can be stably attached on different materials. Further, the nanostructure layer 131 has a plurality of tiny pores so as to modulate the equivalent refractive index of the nanostructure layer 131.

In FIG. 1L, the anti-scratch layer 140 can be further disposed on the anti-reflecting layer 130, and a number of the anti-reflecting layer 130 disposed on the outer side surface 112 is a plurality. Therefore, the scratch can be avoided forming on the outer side surface 112 of the transparent element 110 via the anti-scratch layer 140 so as to avoid influencing the operation of the optical components 121, 122, 123, 124, 125, 126. It should be mentioned that the layer number and the thickness of the anti-reflecting layer 130 are only configured to be the schematic view, so that the layer number and the thickness thereof can be adjusted according to the actual condition, but the present disclosure is not limited thereto.

Figure 1O:
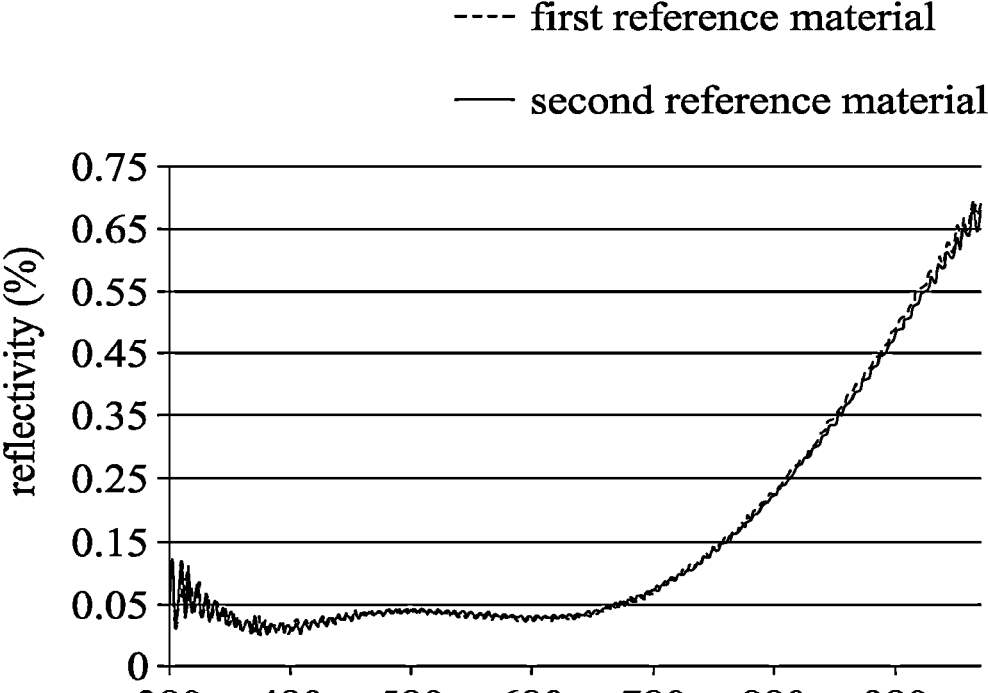
FIG. 1O is a measurement result of the reflectivity according to the 1st example in FIG. 1A.

FIG. 1O is a measurement result of the reflectivity according to the 1st example in FIG. 1A. Table 1 lists the result of the reflectivity according to the 1st example. Table 2 lists an average reflectivity $R_{7590}$ and an average reflectivity $R_{4070}$ according to the 1st example. It should be mentioned that the average reflectivity of at least one portion of the inner side surface 111 of the transparent element 110 corresponding to a light with a wavelength range between 750 nm and 900 nm is $R_{7590}$, the average reflectivity of at least one portion of the inner side surface 111 of the transparent element 110 corresponding to a light with a wavelength range between 400 nm and 700 nm is $R_{4070}$, each of a first reference sheet and a second reference sheet is a plastic substrate (that is corresponding to the transparent element 110), the nanostructure layer 131 is disposed on the surface of each of the plastic substrates so as to be the reference of the reflectivity of the surface of each of the optical components 121, 122, 123, 124, 125, 126 which the nanostructure layer 131 is disposed on.

TABLE 1

| wavelength (nm) | the reflectivity of the first reference sheet (%) | the reflectivity of the second reference sheet (%) |
|---|---|---|
| 380 | 0.0472 | 0.0472 |
| 381 | 0.0585 | 0.1074 |
| 382 | 0.0998 | 0.0998 |
| 383 | 0.1204 | 0.1204 |
| 384 | 0.0918 | 0.0918 |
| 385 | 0.0403 | 0.0357 |
| 386 | 0.052 | 0.0141 |
| 387 | 0.0708 | 0.0577 |
| 388 | 0.0663 | 0.0957 |
| 389 | 0.0938 | 0.0983 |
| 390 | 0.0995 | 0.117 |
| 391 | 0.0931 | 0.0931 |
| 392 | 0.079 | 0.055 |

9

TABLE 1-continued

| wavelength (nm) | the reflectivity of the first reference sheet (%) | the reflectivity of the second reference sheet (%) |
|---|---|---|
| 393 | 0.0716 | 0.0296 |
| 394 | 0.0584 | 0.0584 |
| 395 | 0.084 | 0.0995 |
| 396 | 0.1073 | 0.0882 |
| 397 | 0.0665 | 0.0832 |
| 398 | 0.071 | 0.0619 |
| 399 | 0.058 | 0.0387 |
| 400 | 0.0559 | 0.0373 |
| 401 | 0.0716 | 0.0716 |
| 402 | 0.0693 | 0.0693 |
| 403 | 0.0791 | 0.0791 |
| 404 | 0.0806 | 0.0646 |
| 405 | 0.0626 | 0.0587 |
| 406 | 0.0529 | 0.0377 |
| 407 | 0.0329 | 0.0294 |
| 408 | 0.0428 | 0.0428 |
| 409 | 0.0586 | 0.0586 |
| 410 | 0.0591 | 0.0662 |
| 411 | 0.0616 | 0.0439 |
| 412 | 0.049 | 0.0366 |
| 413 | 0.0362 | 0.0241 |
| 414 | 0.0285 | 0.0234 |
| 415 | 0.041 | 0.041 |
| 416 | 0.0338 | 0.0448 |
| 417 | 0.0459 | 0.053 |
| 418 | 0.0515 | 0.0394 |
| 419 | 0.0417 | 0.0301 |
| 420 | 0.039 | 0.0293 |
| 421 | 0.0347 | 0.0251 |
| 422 | 0.0336 | 0.0358 |
| 423 | 0.0442 | 0.0454 |
| 424 | 0.0444 | 0.0433 |
| 425 | 0.0435 | 0.0315 |
| 426 | 0.0317 | 0.0201 |
| 427 | 0.0252 | 0.0168 |
| 428 | 0.0179 | 0.0192 |
| 429 | 0.0279 | 0.0327 |
| 430 | 0.0377 | 0.0377 |
| 431 | 0.0326 | 0.0252 |
| 432 | 0.0252 | 0.0173 |
| 433 | 0.0245 | 0.0201 |
| 434 | 0.021 | 0.0156 |
| 435 | 0.0159 | 0.0155 |
| 436 | 0.0231 | 0.0231 |
| 437 | 0.0266 | 0.023 |
| 438 | 0.0251 | 0.0229 |
| 439 | 0.0227 | 0.0081 |
| 440 | 0.0226 | 0.0135 |
| 441 | 0.0155 | 0.0111 |
| 442 | 0.0129 | 0.0096 |
| 443 | 0.015 | 0.022 |
| 444 | 0.0223 | 0.0223 |
| 445 | 0.0222 | 0.0222 |
| 446 | 0.0167 | 0.0167 |
| 447 | 0.0218 | 0.0146 |
| 448 | 0.0112 | 0.0056 |
| 449 | 0.007 | 0.0105 |
| 450 | 0.0197 | 0.0269 |
| 451 | 0.0215 | 0.0286 |
| 452 | 0.025 | 0.0196 |
| 453 | 0.0176 | 0.0141 |
| 454 | 0.0106 | 0.0036 |
| 455 | 0.0069 | 0.0069 |
| 456 | 0.0069 | 0.0086 |
| 457 | 0.0136 | 0.017 |
| 458 | 0.0201 | 0.0201 |
| 459 | 0.0199 | 0.0132 |
| 460 | 0.0114 | 0.0065 |
| 461 | 0.0032 | 0.0032 |
| 462 | 0.0096 | 0.0096 |
| 463 | 0.0063 | 0.0064 |
| 464 | 0.0138 | 0.0184 |
| 465 | 0.018 | 0.015 |
| 466 | 0.0132 | 0.0118 |
| 467 | 0.0172 | 0.0115 |
| 468 | 0.0098 | 0.0098 |

10

TABLE 1-continued

| wavelength (nm) | the reflectivity of the first reference sheet (%) | the reflectivity of the second reference sheet (%) |
|---|---|---|
| 469 | 0.0055 | 0.0084 |
| 470 | 0.0096 | 0.015 |
| 471 | 0.0108 | 0.0106 |
| 472 | 0.0205 | 0.0168 |
| 473 | 0.0173 | 0.0147 |
| 474 | 0.0108 | 0.0059 |
| 475 | 0.0095 | 0.005 |
| 476 | 0.0092 | 0.0138 |
| 477 | 0.0113 | 0.0134 |
| 478 | 0.013 | 0.0164 |
| 479 | 0.0167 | 0.0126 |
| 480 | 0.0123 | 0.0123 |
| 481 | 0.0119 | 0.0098 |
| 482 | 0.0116 | 0.0078 |
| 483 | 0.0116 | 0.0151 |
| 484 | 0.0183 | 0.0147 |
| 485 | 0.0198 | 0.0182 |
| 486 | 0.0209 | 0.0153 |
| 487 | 0.0136 | 0.01 |
| 488 | 0.0133 | 0.0077 |
| 489 | 0.0094 | 0.0098 |
| 490 | 0.0166 | 0.0147 |
| 491 | 0.0157 | 0.0186 |
| 492 | 0.0192 | 0.0182 |
| 493 | 0.0208 | 0.0178 |
| 494 | 0.0203 | 0.0174 |
| 495 | 0.0169 | 0.0115 |
| 496 | 0.0139 | 0.0139 |
| 497 | 0.0152 | 0.0167 |
| 498 | 0.0203 | 0.0208 |
| 499 | 0.0232 | 0.0208 |
| 500 | 0.0204 | 0.0204 |
| 501 | 0.0185 | 0.0185 |
| 502 | 0.0171 | 0.0171 |
| 503 | 0.0169 | 0.0191 |
| 504 | 0.0187 | 0.0195 |
| 505 | 0.0223 | 0.0246 |
| 506 | 0.0266 | 0.025 |
| 507 | 0.0222 | 0.022 |
| 508 | 0.0231 | 0.0209 |
| 509 | 0.0212 | 0.0203 |
| 510 | 0.0208 | 0.0208 |
| 511 | 0.0208 | 0.0229 |
| 512 | 0.0248 | 0.0261 |
| 513 | 0.0245 | 0.0233 |
| 514 | 0.0249 | 0.023 |
| 515 | 0.0244 | 0.0227 |
| 516 | 0.0207 | 0.0207 |
| 517 | 0.0237 | 0.0237 |
| 518 | 0.0255 | 0.0271 |
| 519 | 0.0286 | 0.0268 |
| 520 | 0.0272 | 0.0255 |
| 521 | 0.0269 | 0.0263 |
| 522 | 0.0259 | 0.0259 |
| 523 | 0.0256 | 0.0273 |
| 524 | 0.0266 | 0.0277 |
| 525 | 0.0294 | 0.0305 |
| 526 | 0.0298 | 0.03 |
| 527 | 0.028 | 0.028 |
| 528 | 0.0291 | 0.0285 |
| 529 | 0.0289 | 0.0283 |
| 530 | 0.0258 | 0.0272 |
| 531 | 0.0288 | 0.0301 |
| 532 | 0.0318 | 0.0324 |
| 533 | 0.0315 | 0.0331 |
| 534 | 0.0321 | 0.0309 |
| 535 | 0.029 | 0.029 |
| 536 | 0.0294 | 0.0294 |
| 537 | 0.0311 | 0.032 |
| 538 | 0.0327 | 0.0356 |
| 539 | 0.0317 | 0.0331 |
| 540 | 0.0346 | 0.0349 |
| 541 | 0.0334 | 0.0329 |
| 542 | 0.0323 | 0.0323 |
| 543 | 0.0319 | 0.0324 |
| 544 | 0.0318 | 0.0341 |

11

TABLE 1-continued

12

TABLE 1-continued

| wavelength (nm) | the reflectivity of the first reference sheet (%) | the reflectivity of the second reference sheet (%) | | wavelength (nm) | the reflectivity of the first reference sheet (%) | the reflectivity of the second reference sheet (%) |
|---|---|---|---|---|---|---|
| 545 | 0.0345 | 0.035 | | 621 | 0.0343 | 0.037 |
| 546 | 0.035 | 0.0363 | | 622 | 0.0353 | 0.0388 |
| 547 | 0.0338 | 0.0353 | | 623 | 0.0357 | 0.037 |
| 548 | 0.0351 | 0.0354 | | 624 | 0.0352 | 0.0362 |
| 549 | 0.0334 | 0.0338 | | 625 | 0.0334 | 0.0347 |
| 550 | 0.0337 | 0.0339 | | 626 | 0.032 | 0.0346 |
| 551 | 0.0341 | 0.0357 | | 627 | 0.0325 | 0.0351 |
| 552 | 0.0348 | 0.0367 | | 628 | 0.034 | 0.0357 |
| 553 | 0.0359 | 0.0368 | | 629 | 0.0343 | 0.0368 |
| 554 | 0.0373 | 0.0376 | | 630 | 0.035 | 0.0355 |
| 555 | 0.0363 | 0.0363 | | 631 | 0.033 | 0.0349 |
| 556 | 0.0355 | 0.036 | | 632 | 0.0321 | 0.0333 |
| 557 | 0.0337 | 0.0352 | | 633 | 0.0317 | 0.0341 |
| 558 | 0.0351 | 0.0379 | | 634 | 0.0319 | 0.0342 |
| 559 | 0.0357 | 0.0387 | | 635 | 0.033 | 0.0348 |
| 560 | 0.0374 | 0.039 | | 636 | 0.033 | 0.0347 |
| 561 | 0.0368 | 0.0383 | | 637 | 0.0342 | 0.0354 |
| 562 | 0.0374 | 0.0378 | | 638 | 0.0316 | 0.0331 |
| 563 | 0.0364 | 0.0364 | | 639 | 0.0306 | 0.0331 |
| 564 | 0.0362 | 0.0366 | | 640 | 0.0298 | 0.0332 |
| 565 | 0.0368 | 0.0384 | | 641 | 0.0305 | 0.0344 |
| 566 | 0.0361 | 0.0389 | | 642 | 0.0322 | 0.0346 |
| 567 | 0.037 | 0.0403 | | 643 | 0.0334 | 0.0347 |
| 568 | 0.0397 | 0.04 | | 644 | 0.032 | 0.034 |
| 569 | 0.0373 | 0.0389 | | 645 | 0.0311 | 0.0326 |
| 570 | 0.0363 | 0.0367 | | 646 | 0.0286 | 0.03 |
| 571 | 0.0359 | 0.0374 | | 647 | 0.0291 | 0.0317 |
| 572 | 0.036 | 0.0376 | | 648 | 0.0301 | 0.0327 |
| 573 | 0.0376 | 0.0392 | | 649 | 0.0312 | 0.0339 |
| 574 | 0.0385 | 0.0401 | | 650 | 0.0315 | 0.0329 |
| 575 | 0.0394 | 0.0395 | | 651 | 0.0304 | 0.0317 |
| 576 | 0.0376 | 0.0376 | | 652 | 0.0304 | 0.0318 |
| 577 | 0.0363 | 0.0376 | | 653 | 0.0285 | 0.0298 |
| 578 | 0.0364 | 0.0397 | | 654 | 0.0292 | 0.0319 |
| 579 | 0.0379 | 0.0397 | | 655 | 0.0292 | 0.0329 |
| 580 | 0.0366 | 0.0412 | | 656 | 0.0299 | 0.0326 |
| 581 | 0.0392 | 0.0414 | | 657 | 0.0306 | 0.0332 |
| 582 | 0.0393 | 0.0405 | | 658 | 0.0292 | 0.0306 |
| 583 | 0.0393 | 0.0393 | | 659 | 0.0289 | 0.0305 |
| 584 | 0.0369 | 0.0385 | | 660 | 0.0285 | 0.0305 |
| 585 | 0.0369 | 0.0385 | | 661 | 0.0282 | 0.0305 |
| 586 | 0.0375 | 0.0393 | | 662 | 0.0278 | 0.0305 |
| 587 | 0.0378 | 0.0408 | | 663 | 0.0302 | 0.0328 |
| 588 | 0.0397 | 0.0413 | | 664 | 0.0291 | 0.0312 |
| 589 | 0.0401 | 0.0406 | | 665 | 0.0282 | 0.0295 |
| 590 | 0.0376 | 0.0393 | | 666 | 0.0277 | 0.0291 |
| 591 | 0.0362 | 0.0391 | | 667 | 0.0275 | 0.0302 |
| 592 | 0.0356 | 0.0388 | | 668 | 0.0269 | 0.029 |
| 593 | 0.0375 | 0.0391 | | 669 | 0.0277 | 0.0307 |
| 594 | 0.0392 | 0.0408 | | 670 | 0.0289 | 0.0305 |
| 595 | 0.0397 | 0.0401 | | 671 | 0.0289 | 0.0302 |
| 596 | 0.0395 | 0.0395 | | 672 | 0.0277 | 0.0286 |
| 597 | 0.0361 | 0.0377 | | 673 | 0.0261 | 0.0269 |
| 598 | 0.036 | 0.0383 | | 674 | 0.0262 | 0.0276 |
| 599 | 0.0358 | 0.0378 | | 675 | 0.0266 | 0.0292 |
| 600 | 0.0357 | 0.0388 | | 676 | 0.0282 | 0.0309 |
| 601 | 0.0386 | 0.039 | | 677 | 0.0291 | 0.031 |
| 602 | 0.0392 | 0.0407 | | 678 | 0.0281 | 0.0294 |
| 603 | 0.0377 | 0.0393 | | 679 | 0.0278 | 0.0292 |
| 604 | 0.0366 | 0.0381 | | 680 | 0.0266 | 0.0293 |
| 605 | 0.0349 | 0.0379 | | 681 | 0.0267 | 0.0286 |
| 606 | 0.0353 | 0.0377 | | 682 | 0.0278 | 0.0291 |
| 607 | 0.036 | 0.0385 | | 683 | 0.0268 | 0.0307 |
| 608 | 0.037 | 0.0387 | | 684 | 0.0294 | 0.0308 |
| 609 | 0.0381 | 0.0396 | | 685 | 0.0274 | 0.0294 |
| 610 | 0.037 | 0.0385 | | 686 | 0.0265 | 0.0281 |
| 611 | 0.0358 | 0.0381 | | 687 | 0.0255 | 0.0281 |
| 612 | 0.0344 | 0.0372 | | 688 | 0.0261 | 0.0285 |
| 613 | 0.0341 | 0.037 | | 689 | 0.0282 | 0.0302 |
| 614 | 0.0355 | 0.0383 | | 690 | 0.0282 | 0.0299 |
| 615 | 0.0361 | 0.0381 | | 691 | 0.0282 | 0.0308 |
| 616 | 0.0369 | 0.0371 | | 692 | 0.0279 | 0.0292 |
| 617 | 0.0341 | 0.0368 | | 693 | 0.0274 | 0.0293 |
| 618 | 0.0347 | 0.036 | | 694 | 0.0272 | 0.0289 |
| 619 | 0.0335 | 0.0348 | | 695 | 0.0267 | 0.0293 |
| 620 | 0.0342 | 0.0366 | | 696 | 0.0291 | 0.0307 |

TABLE 1-continued

| wavelength (nm) | the reflectivity of the first reference sheet (%) | the reflectivity of the second reference sheet (%) |
|---|---|---|
| 697 | 0.0285 | 0.0306 |
| 698 | 0.0292 | 0.0314 |
| 699 | 0.0292 | 0.0306 |
| 700 | 0.0289 | 0.0289 |
| 701 | 0.0278 | 0.0283 |
| 702 | 0.0269 | 0.0291 |
| 703 | 0.0276 | 0.0314 |
| 704 | 0.0304 | 0.0317 |
| 705 | 0.0304 | 0.0317 |
| 706 | 0.0296 | 0.031 |
| 707 | 0.0302 | 0.0304 |
| 708 | 0.029 | 0.0304 |
| 709 | 0.0286 | 0.0313 |
| 710 | 0.0305 | 0.0331 |
| 711 | 0.0305 | 0.0332 |
| 712 | 0.0293 | 0.0306 |
| 713 | 0.031 | 0.0324 |
| 714 | 0.032 | 0.0327 |
| 715 | 0.0301 | 0.0321 |
| 716 | 0.0322 | 0.0335 |
| 717 | 0.0319 | 0.0346 |
| 718 | 0.0316 | 0.0343 |
| 719 | 0.0334 | 0.0341 |
| 720 | 0.0325 | 0.0338 |
| 721 | 0.0336 | 0.0325 |
| 722 | 0.0325 | 0.0332 |
| 723 | 0.0335 | 0.0349 |
| 724 | 0.0327 | 0.0366 |
| 725 | 0.0354 | 0.0368 |
| 726 | 0.036 | 0.0374 |
| 727 | 0.0368 | 0.0373 |
| 728 | 0.0356 | 0.0344 |
| 729 | 0.0367 | 0.0369 |
| 730 | 0.0356 | 0.0375 |
| 731 | 0.0365 | 0.0392 |
| 732 | 0.0382 | 0.0398 |
| 733 | 0.0386 | 0.0384 |
| 734 | 0.0392 | 0.0388 |
| 735 | 0.0393 | 0.0398 |
| 736 | 0.0376 | 0.0388 |
| 737 | 0.0387 | 0.0413 |
| 738 | 0.0391 | 0.0405 |
| 739 | 0.0409 | 0.0423 |
| 740 | 0.0438 | 0.0429 |
| 741 | 0.0429 | 0.043 |
| 742 | 0.0417 | 0.0427 |
| 743 | 0.0418 | 0.0425 |
| 744 | 0.043 | 0.0444 |
| 745 | 0.0434 | 0.0448 |
| 746 | 0.0477 | 0.047 |
| 747 | 0.0471 | 0.0457 |
| 748 | 0.0455 | 0.0455 |
| 749 | 0.0466 | 0.0466 |
| 750 | 0.0467 | 0.0471 |
| 751 | 0.0476 | 0.0483 |
| 752 | 0.0494 | 0.0504 |
| 753 | 0.05 | 0.0514 |
| 754 | 0.0504 | 0.0489 |
| 755 | 0.0504 | 0.049 |
| 756 | 0.0499 | 0.0494 |
| 757 | 0.0505 | 0.0531 |
| 758 | 0.0511 | 0.0525 |
| 759 | 0.0542 | 0.0556 |
| 760 | 0.0561 | 0.0557 |
| 761 | 0.0554 | 0.0553 |
| 762 | 0.0564 | 0.0564 |
| 763 | 0.0545 | 0.0545 |
| 764 | 0.0564 | 0.0564 |
| 765 | 0.057 | 0.0582 |
| 766 | 0.06 | 0.06 |
| 767 | 0.0614 | 0.0614 |
| 768 | 0.0614 | 0.0607 |
| 769 | 0.0625 | 0.0611 |
| 770 | 0.0601 | 0.0601 |
| 771 | 0.0597 | 0.0609 |
| 772 | 0.0637 | 0.0644 |

TABLE 1-continued

| wavelength (nm) | the reflectivity of the first reference sheet (%) | the reflectivity of the second reference sheet (%) |
|---|---|---|
| 773 | 0.0648 | 0.0653 |
| 774 | 0.0671 | 0.0671 |
| 775 | 0.0671 | 0.0669 |
| 776 | 0.0664 | 0.0649 |
| 777 | 0.0682 | 0.0667 |
| 778 | 0.0676 | 0.0685 |
| 779 | 0.0717 | 0.0717 |
| 780 | 0.0721 | 0.0717 |
| 781 | 0.0732 | 0.0725 |
| 782 | 0.0743 | 0.0722 |
| 783 | 0.0747 | 0.0746 |
| 784 | 0.0736 | 0.0724 |
| 785 | 0.076 | 0.0755 |
| 786 | 0.0788 | 0.0773 |
| 787 | 0.0795 | 0.0793 |
| 788 | 0.0799 | 0.0784 |
| 789 | 0.0822 | 0.0808 |
| 790 | 0.0807 | 0.08 |
| 791 | 0.0814 | 0.0802 |
| 792 | 0.0819 | 0.0819 |
| 793 | 0.0846 | 0.0846 |
| 794 | 0.0889 | 0.0875 |
| 795 | 0.0899 | 0.0869 |
| 796 | 0.0901 | 0.0885 |
| 797 | 0.089 | 0.0874 |
| 798 | 0.0893 | 0.0884 |
| 799 | 0.0915 | 0.0906 |
| 800 | 0.0931 | 0.0942 |
| 801 | 0.0967 | 0.0966 |
| 802 | 0.0972 | 0.0957 |
| 803 | 0.0986 | 0.0962 |
| 804 | 0.0976 | 0.0968 |
| 805 | 0.0989 | 0.0989 |
| 806 | 0.0999 | 0.0999 |
| 807 | 0.1024 | 0.1024 |
| 808 | 0.1049 | 0.1038 |
| 809 | 0.1074 | 0.1044 |
| 810 | 0.1067 | 0.1051 |
| 811 | 0.1073 | 0.1051 |
| 812 | 0.107 | 0.1056 |
| 813 | 0.1095 | 0.1082 |
| 814 | 0.1109 | 0.1109 |
| 815 | 0.115 | 0.1129 |
| 816 | 0.1161 | 0.1135 |
| 817 | 0.117 | 0.1141 |
| 818 | 0.1164 | 0.1147 |
| 819 | 0.1159 | 0.1146 |
| 820 | 0.1192 | 0.1192 |
| 821 | 0.1221 | 0.1221 |
| 822 | 0.1253 | 0.1223 |
| 823 | 0.1276 | 0.1243 |
| 824 | 0.1258 | 0.1235 |
| 825 | 0.1267 | 0.1242 |
| 826 | 0.128 | 0.1277 |
| 827 | 0.1292 | 0.1291 |
| 828 | 0.1326 | 0.1303 |
| 829 | 0.1351 | 0.1333 |
| 830 | 0.1376 | 0.1363 |
| 831 | 0.136 | 0.1342 |
| 832 | 0.1381 | 0.1351 |
| 833 | 0.1382 | 0.1374 |
| 834 | 0.1411 | 0.1393 |
| 835 | 0.1442 | 0.1424 |
| 836 | 0.1469 | 0.1436 |
| 837 | 0.1476 | 0.147 |
| 838 | 0.1494 | 0.1475 |
| 839 | 0.1494 | 0.1475 |
| 840 | 0.1483 | 0.1482 |
| 841 | 0.1558 | 0.1525 |
| 842 | 0.1561 | 0.1542 |
| 843 | 0.1591 | 0.1572 |
| 844 | 0.1603 | 0.1584 |
| 845 | 0.1611 | 0.1576 |
| 846 | 0.1617 | 0.159 |
| 847 | 0.1612 | 0.1598 |
| 848 | 0.168 | 0.1645 |

TABLE 1-continued

| wavelength (nm) | the reflectivity of the first reference sheet (%) | the reflectivity of the second reference sheet (%) |
|---|---|---|
| 849 | 0.1665 | 0.1625 |
| 850 | 0.1723 | 0.1683 |
| 851 | 0.173 | 0.169 |
| 852 | 0.172 | 0.168 |
| 853 | 0.174 | 0.1721 |
| 854 | 0.174 | 0.1735 |
| 855 | 0.1795 | 0.1755 |
| 856 | 0.1835 | 0.1774 |
| 857 | 0.1846 | 0.1824 |
| 858 | 0.1864 | 0.1827 |
| 859 | 0.1844 | 0.1816 |
| 860 | 0.1862 | 0.1834 |
| 861 | 0.1867 | 0.1846 |
| 862 | 0.1932 | 0.1891 |
| 863 | 0.1943 | 0.1909 |
| 864 | 0.1983 | 0.1939 |
| 865 | 0.1987 | 0.1941 |
| 866 | 0.1988 | 0.1966 |
| 867 | 0.201 | 0.1974 |
| 868 | 0.2025 | 0.2004 |
| 869 | 0.2055 | 0.2034 |
| 870 | 0.2084 | 0.2043 |
| 871 | 0.211 | 0.2086 |
| 872 | 0.213 | 0.2089 |
| 873 | 0.2134 | 0.2092 |
| 874 | 0.2137 | 0.2113 |
| 875 | 0.2147 | 0.2143 |
| 876 | 0.2205 | 0.2163 |
| 877 | 0.2221 | 0.2191 |
| 878 | 0.2265 | 0.2211 |
| 879 | 0.2274 | 0.2231 |
| 880 | 0.2273 | 0.222 |
| 881 | 0.2271 | 0.224 |
| 882 | 0.2298 | 0.2271 |
| 883 | 0.2346 | 0.2325 |
| 884 | 0.2392 | 0.2336 |
| 885 | 0.241 | 0.238 |
| 886 | 0.2437 | 0.2395 |
| 887 | 0.246 | 0.2399 |
| 888 | 0.2426 | 0.2403 |
| 889 | 0.2464 | 0.2422 |
| 890 | 0.2497 | 0.2466 |
| 891 | 0.2533 | 0.2494 |
| 892 | 0.2566 | 0.2522 |
| 893 | 0.2572 | 0.2513 |
| 894 | 0.2567 | 0.2524 |
| 895 | 0.2594 | 0.2551 |
| 896 | 0.2632 | 0.2589 |
| 897 | 0.2664 | 0.2621 |
| 898 | 0.2703 | 0.266 |
| 899 | 0.2746 | 0.2689 |
| 900 | 0.2726 | 0.2679 |
| 901 | 0.2751 | 0.2705 |
| 902 | 0.2771 | 0.2712 |
| 903 | 0.2788 | 0.2744 |
| 904 | 0.2834 | 0.279 |
| 905 | 0.2868 | 0.2824 |
| 906 | 0.2897 | 0.2853 |
| 907 | 0.2897 | 0.2842 |
| 908 | 0.2897 | 0.2862 |
| 909 | 0.2931 | 0.2887 |
| 910 | 0.295 | 0.2905 |
| 911 | 0.2991 | 0.2955 |
| 912 | 0.3017 | 0.298 |
| 913 | 0.3082 | 0.3017 |
| 914 | 0.3057 | 0.3032 |
| 915 | 0.3071 | 0.3018 |
| 916 | 0.3087 | 0.3031 |
| 917 | 0.3138 | 0.3091 |
| 918 | 0.3163 | 0.3116 |
| 919 | 0.3206 | 0.316 |
| 920 | 0.3229 | 0.3182 |
| 921 | 0.3236 | 0.3188 |
| 922 | 0.3256 | 0.3208 |
| 923 | 0.3277 | 0.321 |
| 924 | 0.3312 | 0.3264 |

TABLE 1-continued

| wavelength (nm) | the reflectivity of the first reference sheet (%) | the reflectivity of the second reference sheet (%) |
|---|---|---|
| 925 | 0.3346 | 0.3298 |
| 926 | 0.3391 | 0.3343 |
| 927 | 0.3411 | 0.3362 |
| 928 | 0.3419 | 0.3354 |
| 929 | 0.3442 | 0.3343 |
| 930 | 0.3438 | 0.3397 |
| 931 | 0.3498 | 0.3449 |
| 932 | 0.3531 | 0.3475 |
| 933 | 0.3577 | 0.3526 |
| 934 | 0.3586 | 0.3543 |
| 935 | 0.3601 | 0.3502 |
| 936 | 0.3639 | 0.3561 |
| 937 | 0.3629 | 0.3571 |
| 938 | 0.3693 | 0.3634 |
| 939 | 0.3709 | 0.3652 |
| 940 | 0.3741 | 0.3688 |
| 941 | 0.3763 | 0.371 |
| 942 | 0.3763 | 0.371 |
| 943 | 0.3799 | 0.3724 |
| 944 | 0.3834 | 0.378 |
| 945 | 0.3858 | 0.3783 |
| 946 | 0.3905 | 0.3837 |
| 947 | 0.3942 | 0.3878 |
| 948 | 0.3956 | 0.3901 |
| 949 | 0.3969 | 0.3885 |
| 950 | 0.4005 | 0.392 |
| 951 | 0.4022 | 0.3936 |
| 952 | 0.4055 | 0.3969 |
| 953 | 0.4089 | 0.4058 |
| 954 | 0.4143 | 0.4085 |
| 955 | 0.4178 | 0.4103 |
| 956 | 0.417 | 0.4081 |
| 957 | 0.4191 | 0.4101 |
| 958 | 0.4199 | 0.4116 |
| 959 | 0.4253 | 0.4178 |
| 960 | 0.4296 | 0.4225 |
| 961 | 0.4352 | 0.4261 |
| 962 | 0.4381 | 0.4266 |
| 963 | 0.4368 | 0.4292 |
| 964 | 0.439 | 0.4294 |
| 965 | 0.4366 | 0.4325 |
| 966 | 0.4462 | 0.4397 |
| 967 | 0.449 | 0.4424 |
| 968 | 0.4537 | 0.447 |
| 969 | 0.4565 | 0.4472 |
| 970 | 0.4581 | 0.448 |
| 971 | 0.4557 | 0.448 |
| 972 | 0.4609 | 0.4521 |
| 973 | 0.466 | 0.4589 |
| 974 | 0.4713 | 0.4642 |
| 975 | 0.4757 | 0.4655 |
| 976 | 0.4764 | 0.4677 |
| 977 | 0.4799 | 0.4689 |
| 978 | 0.4768 | 0.4689 |
| 979 | 0.4812 | 0.4737 |
| 980 | 0.4862 | 0.4786 |
| 981 | 0.49 | 0.4823 |
| 982 | 0.4903 | 0.4825 |
| 983 | 0.5008 | 0.489 |
| 984 | 0.4956 | 0.4867 |
| 985 | 0.4979 | 0.4895 |
| 986 | 0.5002 | 0.4903 |
| 987 | 0.505 | 0.5041 |
| 988 | 0.5083 | 0.5034 |
| 989 | 0.5169 | 0.5067 |
| 990 | 0.5186 | 0.5055 |
| 991 | 0.5173 | 0.5079 |
| 992 | 0.5197 | 0.5066 |
| 993 | 0.5186 | 0.5095 |
| 994 | 0.5264 | 0.5196 |
| 995 | 0.5333 | 0.5249 |
| 996 | 0.5359 | 0.5264 |
| 997 | 0.5411 | 0.5277 |
| 998 | 0.5363 | 0.5264 |
| 999 | 0.541 | 0.5309 |
| 1000 | 0.5375 | 0.532 |

TABLE 1-continued

| wavelength (nm) | the reflectivity of the first reference sheet (%) | the reflectivity of the second reference sheet (%) |
|---|---|---|
| 1001 | 0.55 | 0.5404 |
| 1002 | 0.5532 | 0.5479 |
| 1003 | 0.5617 | 0.5497 |
| 1004 | 0.5523 | 0.5452 |
| 1005 | 0.5607 | 0.5501 |
| 1006 | 0.5559 | 0.5503 |
| 1007 | 0.5595 | 0.5505 |
| 1008 | 0.5709 | 0.5637 |
| 1009 | 0.5713 | 0.5652 |
| 1010 | 0.5807 | 0.5732 |
| 1011 | 0.5806 | 0.5681 |
| 1012 | 0.5794 | 0.5623 |
| 1013 | 0.5779 | 0.5644 |
| 1014 | 0.5769 | 0.5759 |
| 1015 | 0.5861 | 0.5793 |
| 1016 | 0.5976 | 0.5907 |
| 1017 | 0.6057 | 0.5927 |
| 1018 | 0.6021 | 0.5878 |
| 1019 | 0.598 | 0.5856 |
| 1020 | 0.5969 | 0.5894 |
| 1021 | 0.6017 | 0.5941 |
| 1022 | 0.604 | 0.604 |
| 1023 | 0.6226 | 0.6127 |
| 1024 | 0.6276 | 0.6112 |
| 1025 | 0.6242 | 0.6075 |
| 1026 | 0.6129 | 0.6036 |
| 1027 | 0.6228 | 0.6065 |
| 1028 | 0.6181 | 0.6125 |
| 1029 | 0.6222 | 0.6222 |
| 1030 | 0.632 | 0.632 |
| 1031 | 0.6519 | 0.6327 |
| 1032 | 0.6475 | 0.6277 |
| 1033 | 0.6383 | 0.618 |
| 1034 | 0.6366 | 0.6238 |
| 1035 | 0.6309 | 0.6308 |
| 1036 | 0.6549 | 0.65 |
| 1037 | 0.6658 | 0.6485 |
| 1038 | 0.668 | 0.6487 |
| 1039 | 0.6616 | 0.6489 |
| 1040 | 0.651 | 0.6389 |
| 1041 | 0.6544 | 0.6467 |
| 1042 | 0.6563 | 0.6485 |
| 1043 | 0.6583 | 0.6562 |
| 1044 | 0.6848 | 0.6839 |
| 1045 | 0.6876 | 0.6738 |
| 1046 | 0.693 | 0.6789 |
| 1047 | 0.6784 | 0.6527 |
| 1048 | 0.6629 | 0.6477 |
| 1049 | 0.6661 | 0.6781 |
| 1050 | 0.6954 | 0.6882 |

TABLE 2

| | the average reflectivity of the first reference sheet (%) | the average reflectivity of the second reference sheet (%) |
|---|---|---|
| $R_{7590}$ | 0.14 | 0.14 |
| $R_{4070}$ | 0.03 | 0.03 |

It should be mentioned that the dot pattern and the inclined-striped pattern in FIGS. 1A, 1B, 1F to 1I and 1M are configured to indicate the range of the anti-reflecting layer 130 and the range of the light blocking structure 113, respectively, the thickness of the anti-reflecting layer 130, the thickness of anti-scratch layer 140 and the thickness of the light blocking structure 113 are only configured to be the schematic view, and the thicknesses thereof are not shown according to the actual ratio.

2nd Example

Figure 2A:
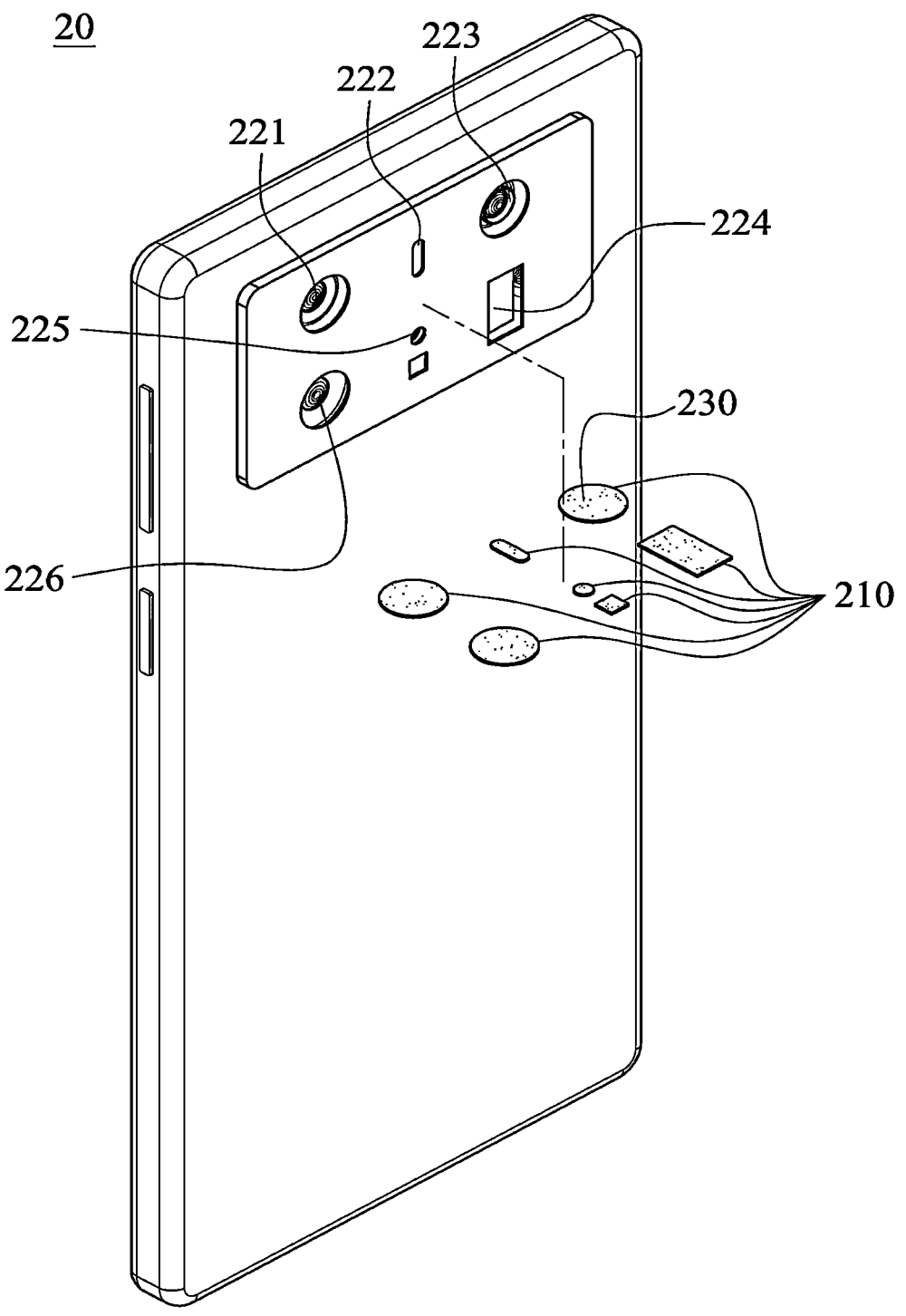
FIG. 2A is a partial exploded view of an electronic device according to the 2nd example of the present disclosure.

FIG. 2A is a partial exploded view of an electronic device 20 according to the 2nd example of the present disclosure. In FIG. 2A, the electronic device 20 can be a smart electronic device, and the electronic device 20 includes a plurality of transparent elements 210, a plurality of optical components 221, 222, 223, 224, 225, 226 and an anti-reflecting layer 230, wherein the transparent elements 210 are configured to separate an inner side and an outer side of the electronic device 20, so that the light (not shown) passes through the transparent elements 210 to enter or leave the electronic device 20.

In detail, each of the transparent elements 210 is corresponding to each of the optical components 221, 222, 223, 224, 225, 226. Therefore, the anti-reflecting layer 230 can be adjusted according to the requirement of the optical component 221.

Figure 2B:
FIG. 2B is a schematic view of the transparent element and the optical component according to the 2nd example in FIG. 2A.
Figure 2B:
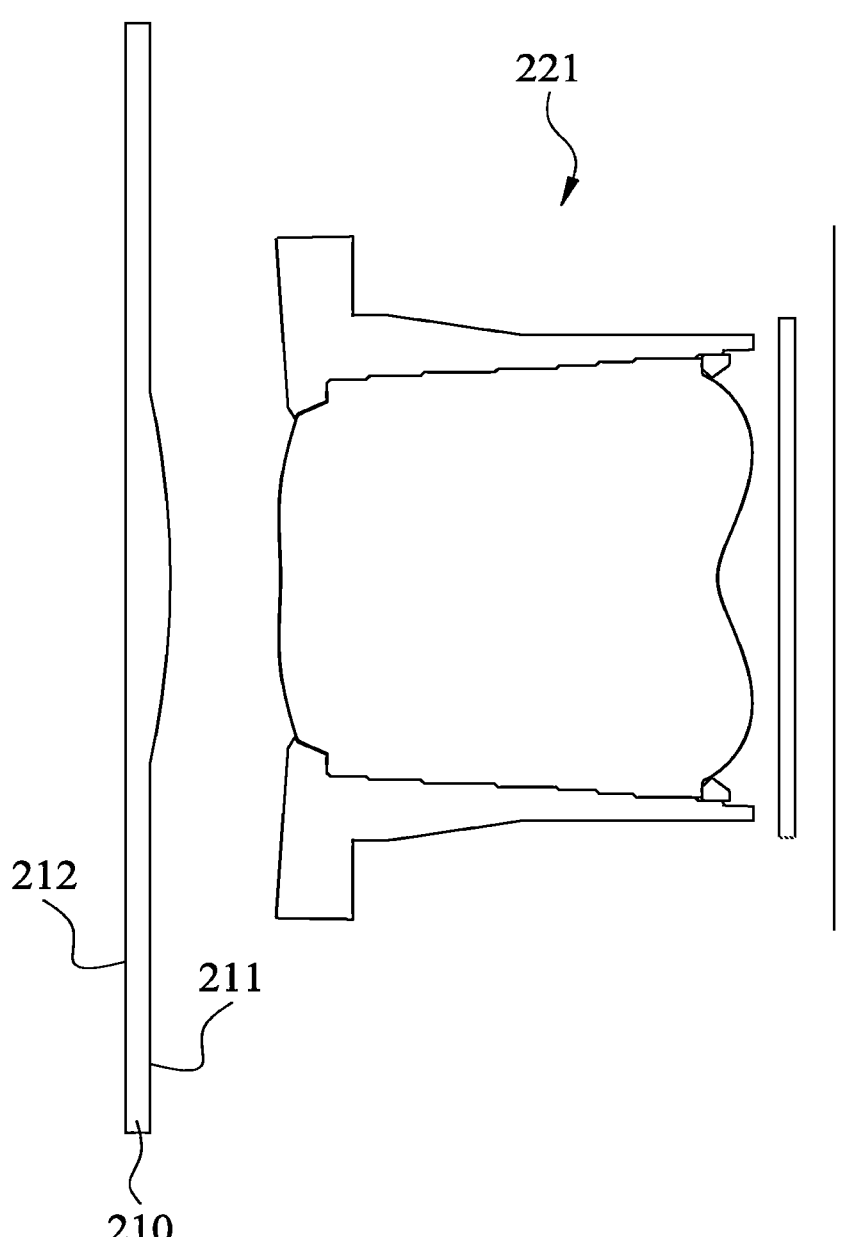

FIG. 2B is a schematic view of the transparent element 210 and the optical component 221 according to the 2nd example in FIG. 2A. In FIG. 2B, each of the transparent elements 210 includes an inner side surface 211 and an outer side surface 212, wherein the inner side surface 211 faces towards the inner side, and the outer side surface 212 faces towards the outer side. Moreover, the inner side surface 211 of each of the transparent elements 210 is non-planar. Therefore, the reflecting path of the light can be changed so as to avoid influencing the operation of the optical component 221 by the reflecting light. Or, the transparent elements 210 can have the refractive power.

It should be mentioned that the dot pattern in FIG. 2A is configured to indicate the range of the anti-reflecting layer 230, the optical system and the structural dispositions according to the 2nd example are the same as the optical system and the structural dispositions according to the 1st example, and hence will not be described again herein.

3rd Example

Figure 3A:
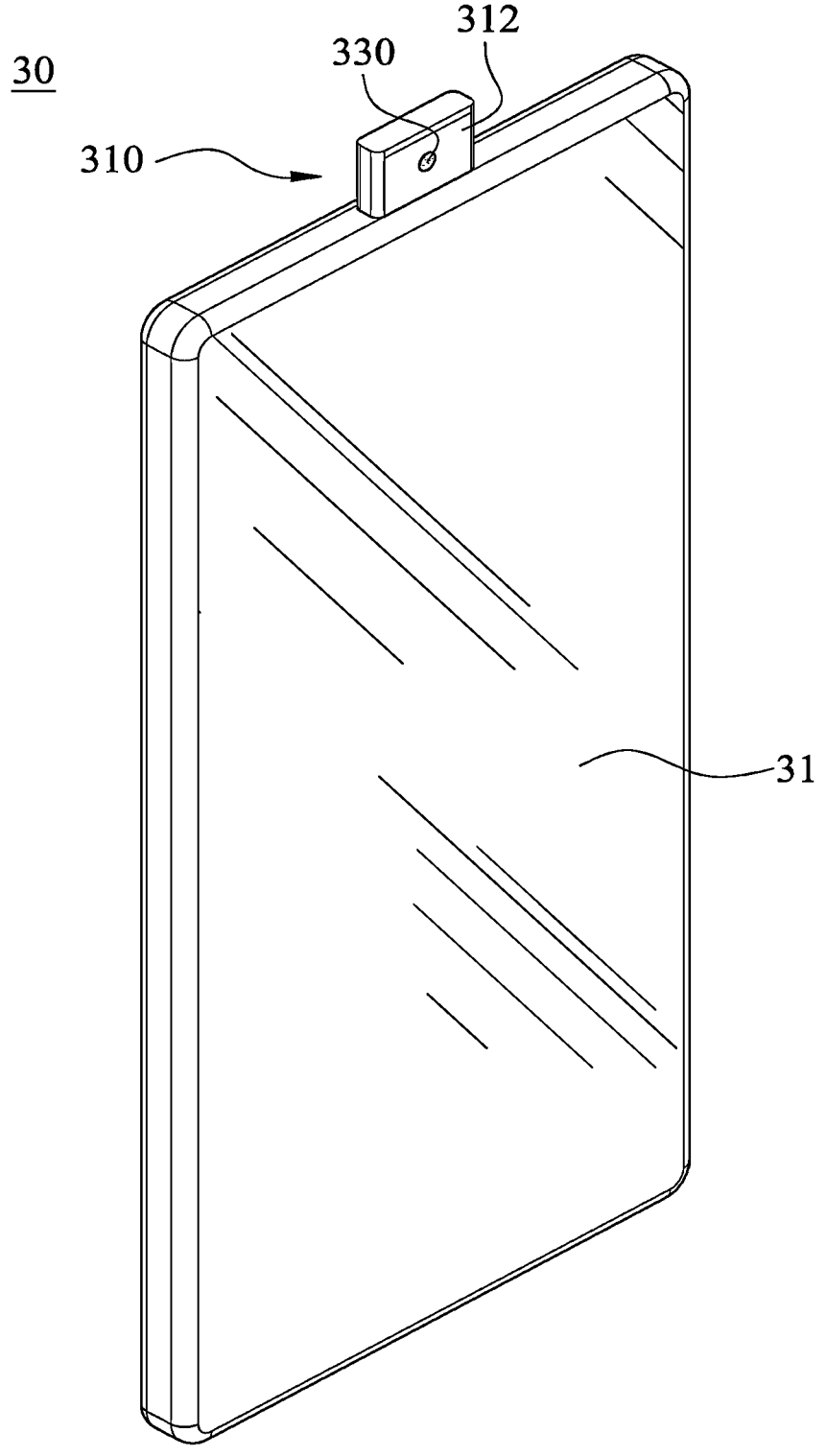
FIG. 3A is a three dimensional view of an electronic device according to the 3rd example of the present disclosure.
Figure 3B:
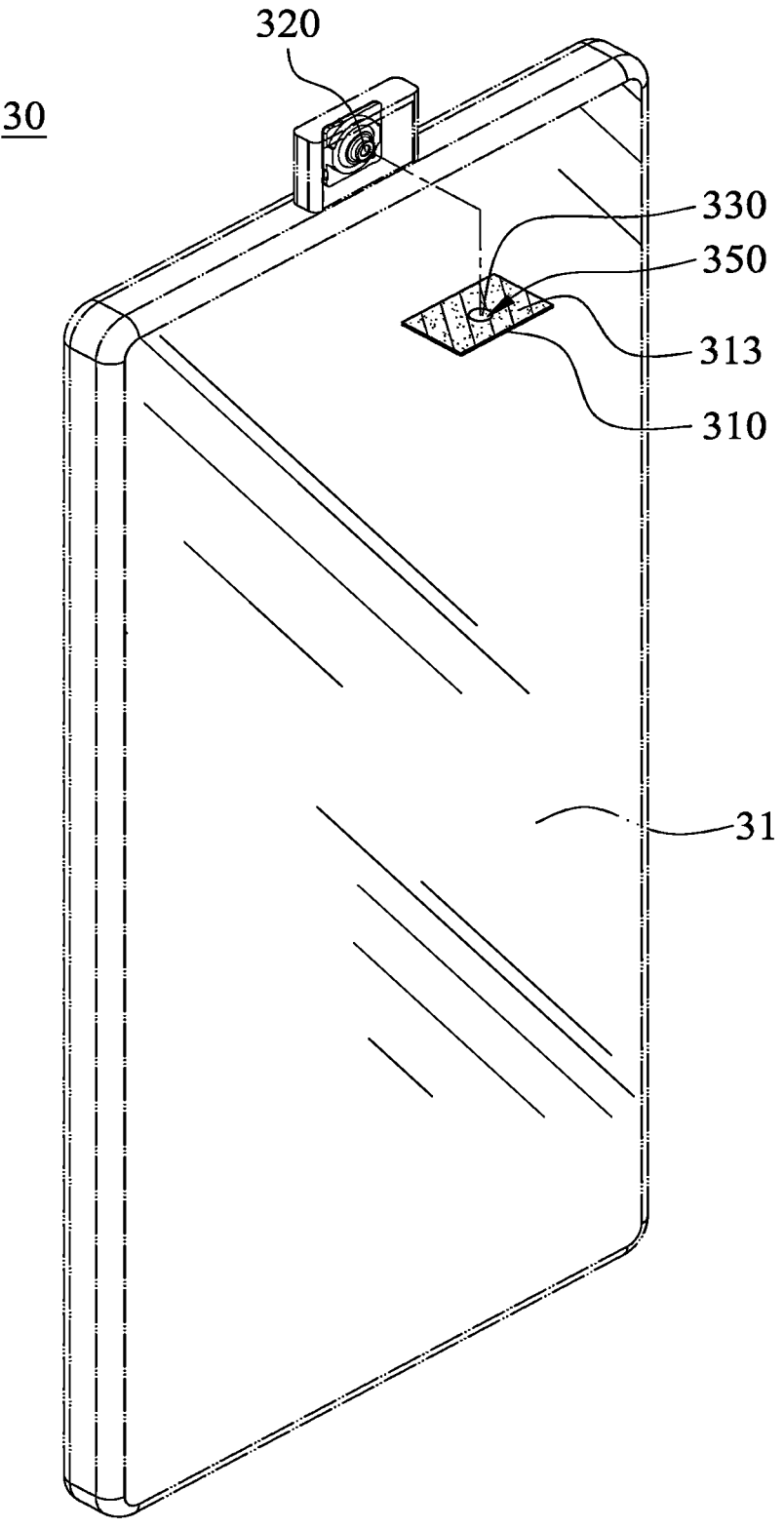
FIG. 3B is a partial exploded view of the electronic device according to the 3rd example in FIG. 3A.

FIG. 3A is a three dimensional view of an electronic device 30 according to the 3rd example of the present disclosure. FIG. 3B is a partial exploded view of the electronic device 30 according to the 3rd example in FIG. 3A. In FIGS. 3A and 3B, the electronic device 30 can be a smart electronic device, and the electronic device 30 includes a transparent element 310, an optical component 320 and an anti-reflecting layer 330.

According to the 3rd example, the optical component 320 is a telescopic imaging camera. When the optical component 320 is idled, the optical component 320 is disposed inside the electronic device 30; when the optical component 320 is started, the optical component 320 is lifted from inside of the electronic device 30 so as to keep the consistency of a display area 31 of the electronic device 30 to enhance the displaying effect. Further, when the optical component 320 is lifted, the transparent element 310 is configured to separate an inner side and an outer side of the electronic device 30, so that the light (not shown) passes through the transparent element 310 to enter or leave the electronic device 30.

The transparent element 310 includes an inner side surface 311 (labeled in FIG. 3D) and an outer side surface 312, wherein the inner side surface 311 faces towards the inner side, and the outer side surface 312 faces towards the outer side. Moreover, the optical component 320 is corresponding to the inner side surface 311 of the transparent element 310, and the anti-reflecting layer 330 is disposed on at least one portion of the inner side surface 311 of the transparent element 310.

Figure 3C:
FIG. 3C is a schematic view of the transparent element according to the 3rd example in FIG. 3A.
Figure 3C:
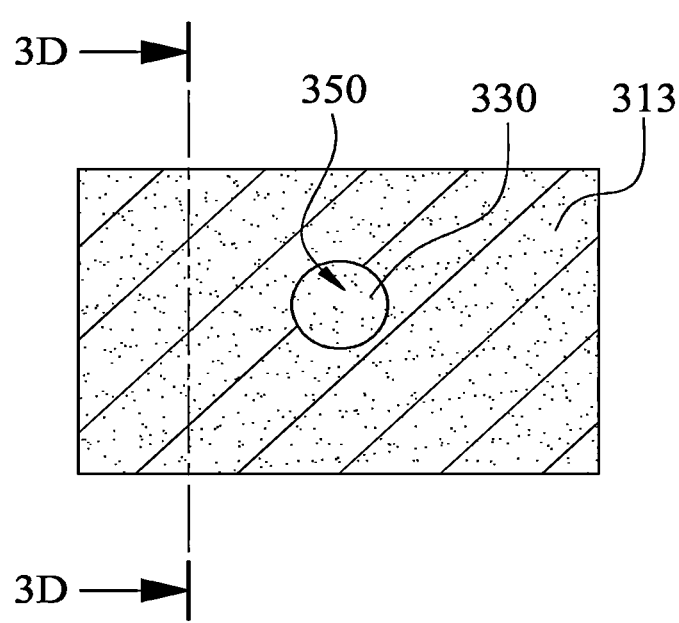

FIG. 3C is a schematic view of the transparent element 310 according to the 3rd example in FIG. 3A. In FIGS. 3B and 3C, the transparent element 310 can further include a light blocking structure 313, wherein the light blocking structure 313 is configured to avoid the light passing through, a light-transmitting area 350 is remained on the transparent element 310 via the light blocking structure 313, and the light-transmitting area 350 is corresponding to the optical component 320, so that the light can pass through the transparent element 310 to enter or leave the electronic device 30. Moreover, the portion except the light-transmitting area 350 can be blocked by disposing the light blocking structure 313 on the transparent element 310 so as to reduce the stray light.

Figure 3D:
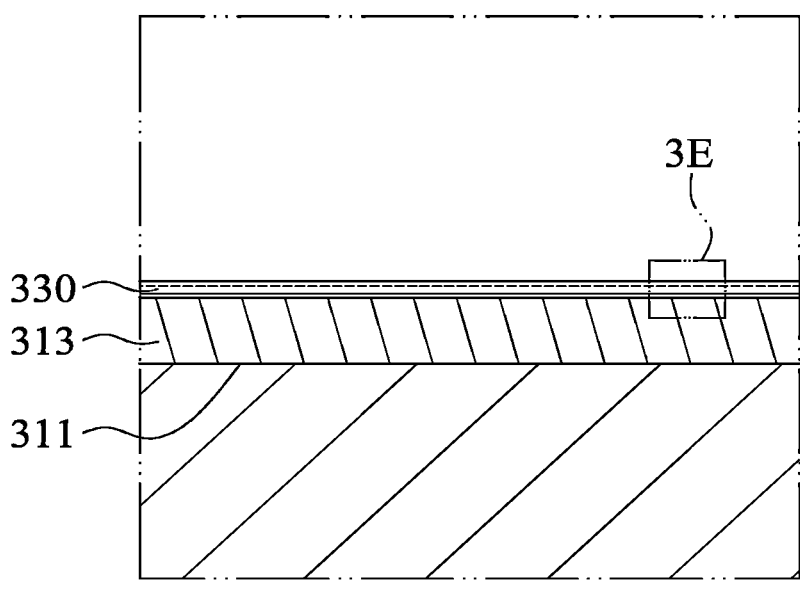
FIG. 3D is a cross-sectional view of the transparent element along a 3D-3D line in FIG. 3C.
Figure 3E:
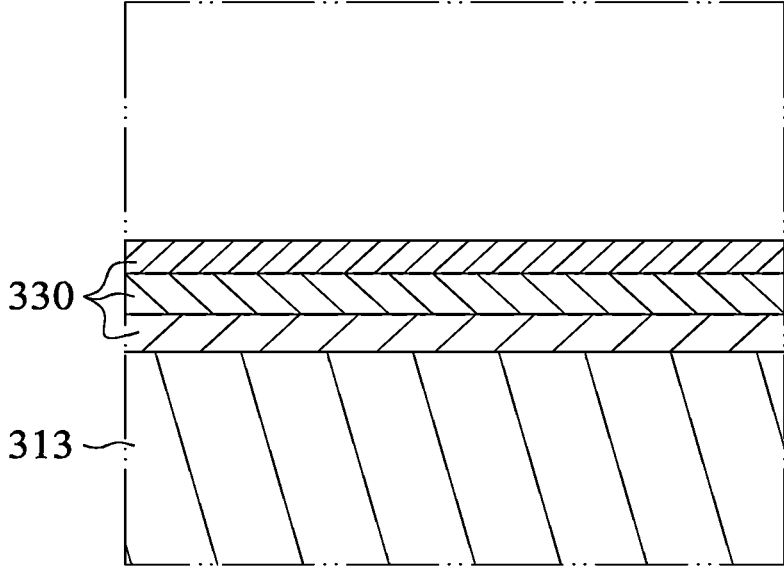
FIG. 3E is a partial enlarged view of the transparent element according to the 3rd example in FIG. 3D.

FIG. 3D is a cross-sectional view of the transparent element 310 along a 3D-3D line in FIG. 3C. FIG. 3E is a partial enlarged view of the transparent element 310 according to the 3rd example in FIG. 3D. In FIGS. 3D and 3E, a number of the anti-reflecting layer 330 is a plurality, wherein the anti-reflecting layer 330 can include a plurality of high refractive index films and a plurality of low refractive index films, which are alternately stacked, so that the anti-reflecting effect can be achieved based on the interference principle of the thin film.

It should be mentioned that the dot pattern and the inclined-striped pattern in FIGS. 3A to 3C are configured to indicate the range of the anti-reflecting layer 330 and the range of the light blocking structure 313, respectively.

4th Example

Figure 4:
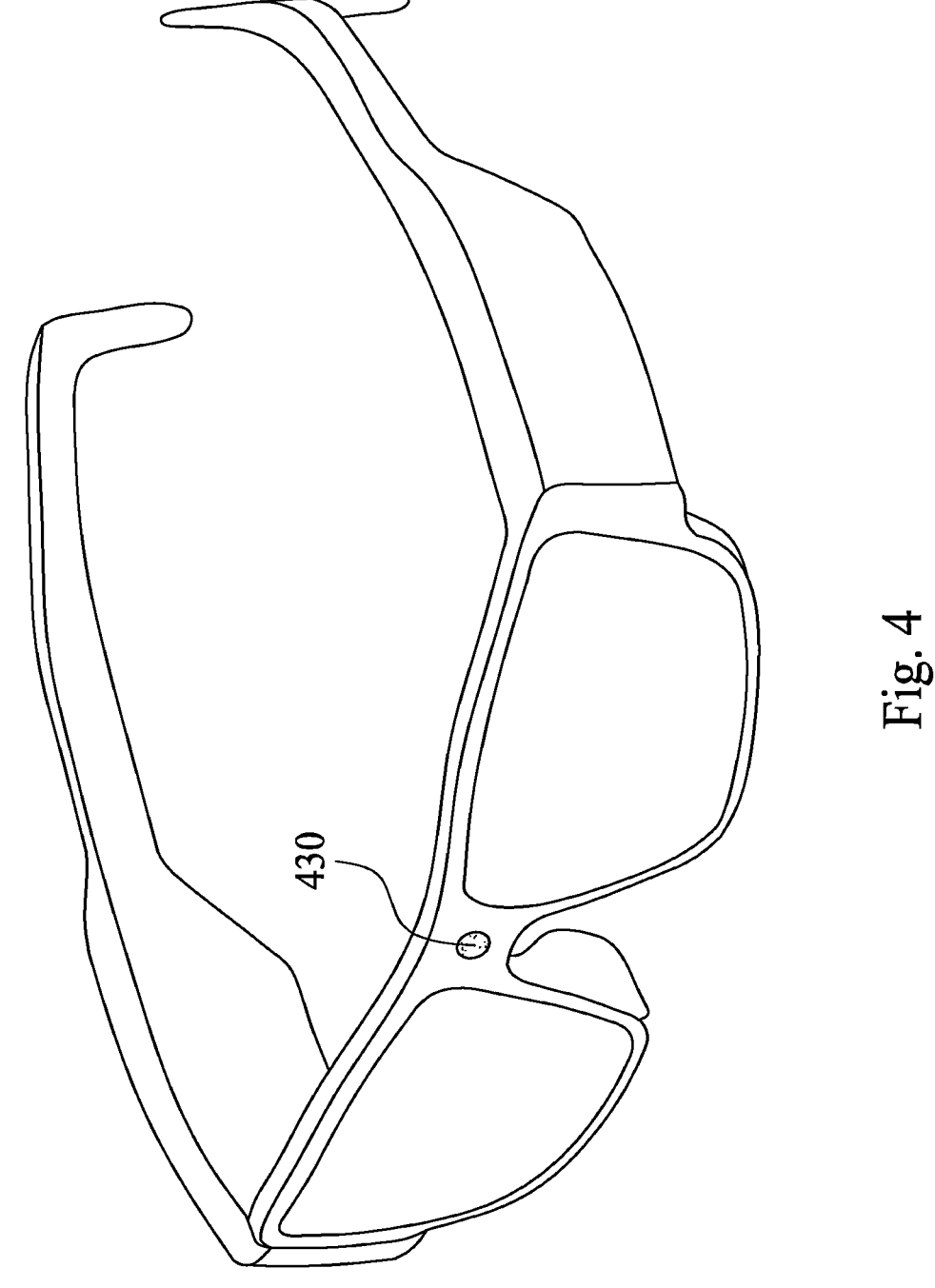
FIG. 4 is a three dimensional view of an electronic device according to the 4th example of the present disclosure.

FIG. 4 is a three dimensional view of an electronic device 40 according to the 4th example of the present disclosure. In FIG. 4, the electronic device 40 can be an AR (Augmented Reality) head-mounted device, and the electronic device 40 includes a transparent element (its reference numeral is omitted), an optical component (its reference numeral is omitted) and an anti-reflecting layer 430, wherein the transparent element is configured to separate an inner side and an outer side of the electronic device 40, so that the light (not shown) passes through the transparent element to enter or leave the electronic device 40.

Moreover, the transparent element includes an inner side surface (its reference numeral is omitted) and an outer side surface (its reference numeral is omitted), wherein the inner side surface faces towards the inner side, the outer side surface faces towards the outer side, the optical component is corresponding to the inner side surface of the transparent element, and the anti-reflecting layer 430 is disposed on at least one portion of the inner side surface of the transparent element.

Further, the disposition and the structural details of the transparent element, the optical component and the anti-reflecting layer according to the 4th example can be referred to the disposition and the structural details of the transparent element, the optical component and the anti-reflecting layer according to any one of the 1st example to the 3rd example, and hence will not be described again herein.

5th Example

Figure 5:
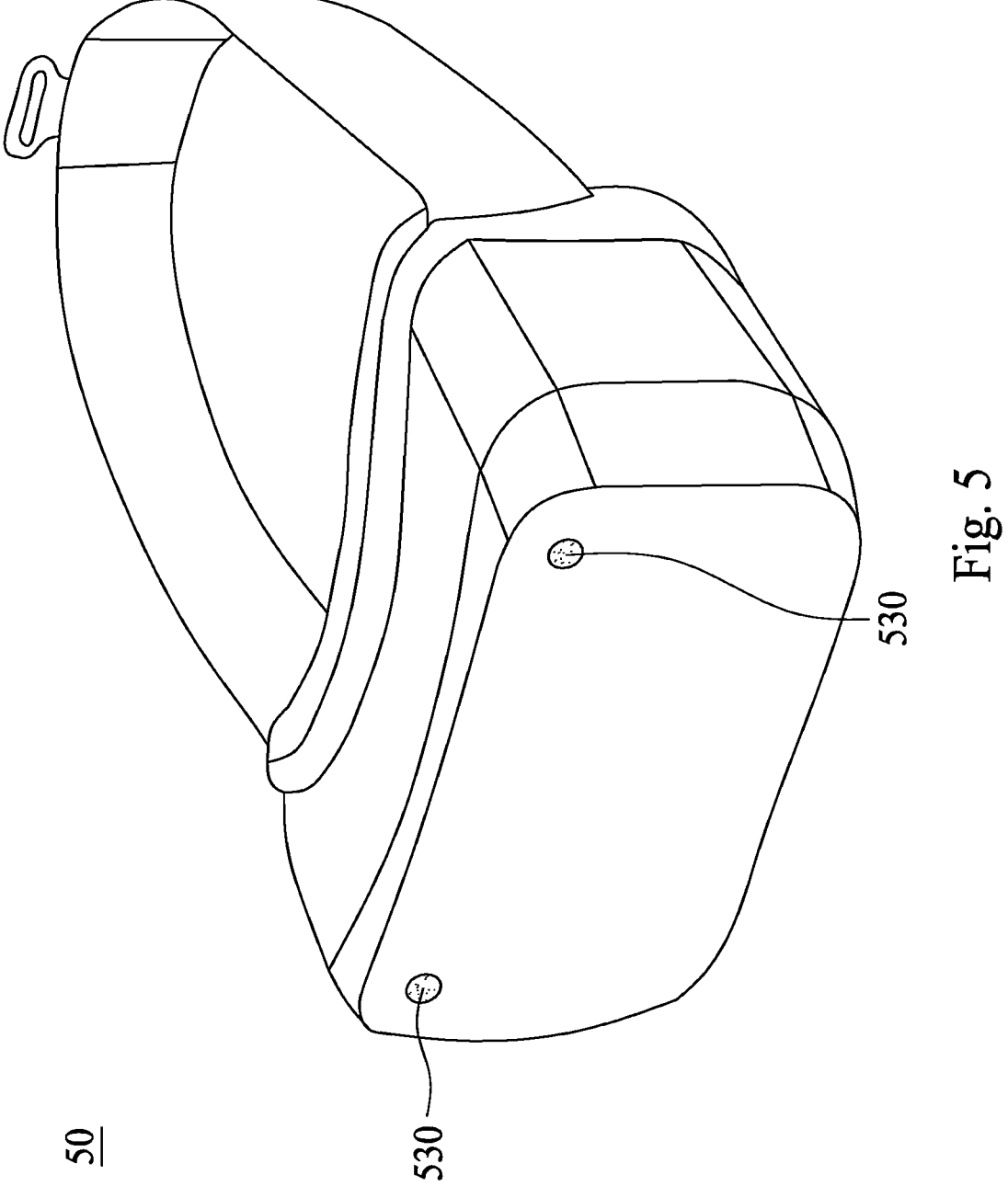
FIG. 5 is a three dimensional view of an electronic device according to the 5th example of the present disclosure.

FIG. 5 is a three dimensional view of an electronic device 50 according to the 5th example of the present disclosure. In FIG. 5, the electronic device 50 can be an VR (Virtual Reality) head-mounted device, and the electronic device 50 includes a transparent element (its reference numeral is omitted), a plurality of optical components (their reference numerals are omitted) and an anti-reflecting layer 530, wherein the transparent element is configured to separate an inner side and an outer side of the electronic device 50, so that the light (not shown) passes through the transparent element to enter or leave the electronic device 50.

Moreover, the transparent element includes an inner side surface (its reference numeral is omitted) and an outer side surface (its reference numeral is omitted), wherein the inner side surface faces towards the inner side, the outer side surface faces towards the outer side, the optical components are corresponding to the inner side surface of the transparent element, and the anti-reflecting layer 530 is disposed on at least one portion of the inner side surface of the transparent element.

Further, the disposition and the structural details of the transparent element, the optical components and the anti-reflecting layer according to the 5th example can be referred to the disposition and the structural details of the transparent element, the optical components and the anti-reflecting layer according to any one of the 1st example to the 3rd example, and hence will not be described again herein.

6th Example

Figure 6:
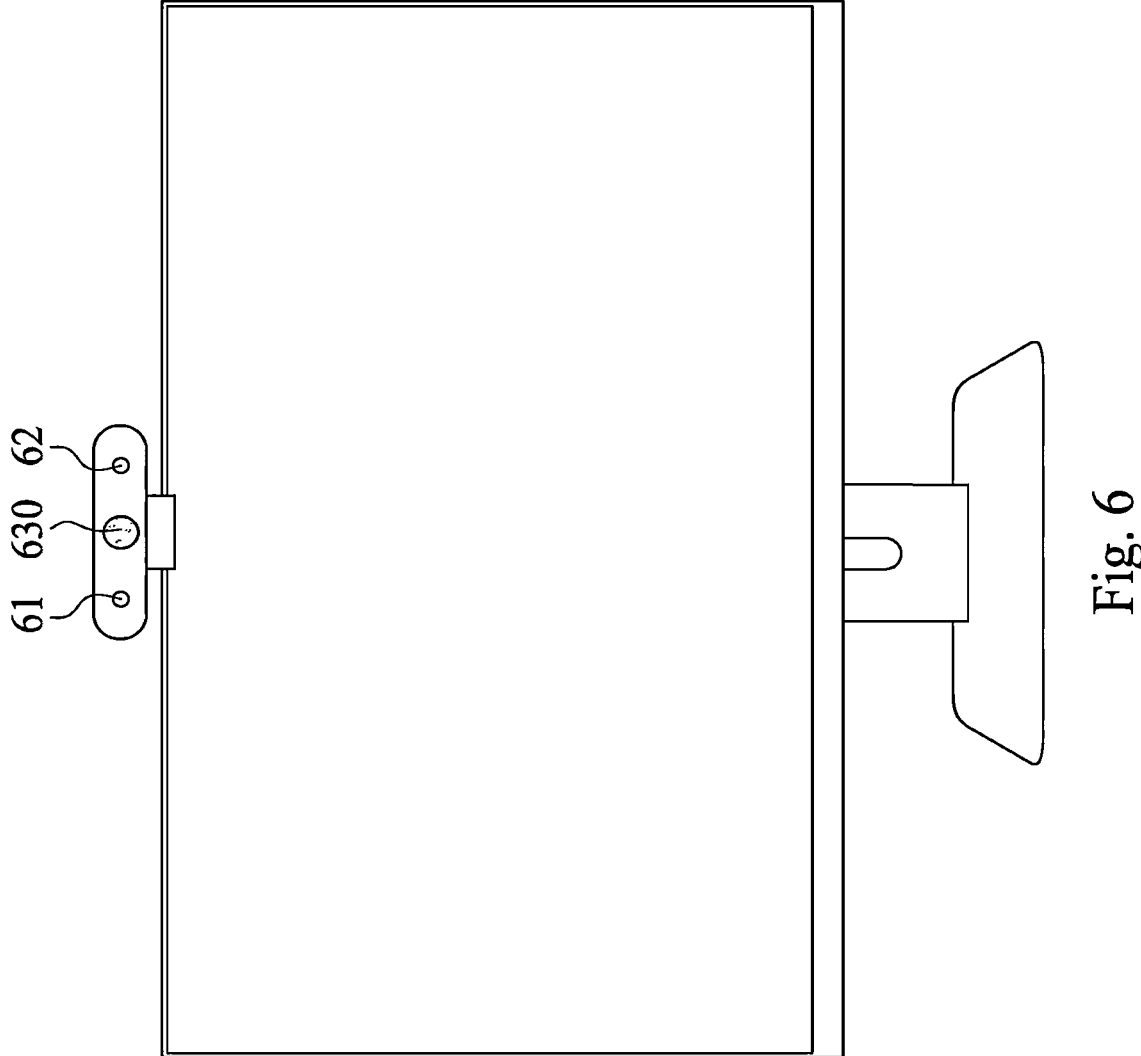
FIG. 6 is a three dimensional view of an electronic device according to the 6th example of the present disclosure.
Figure 7:
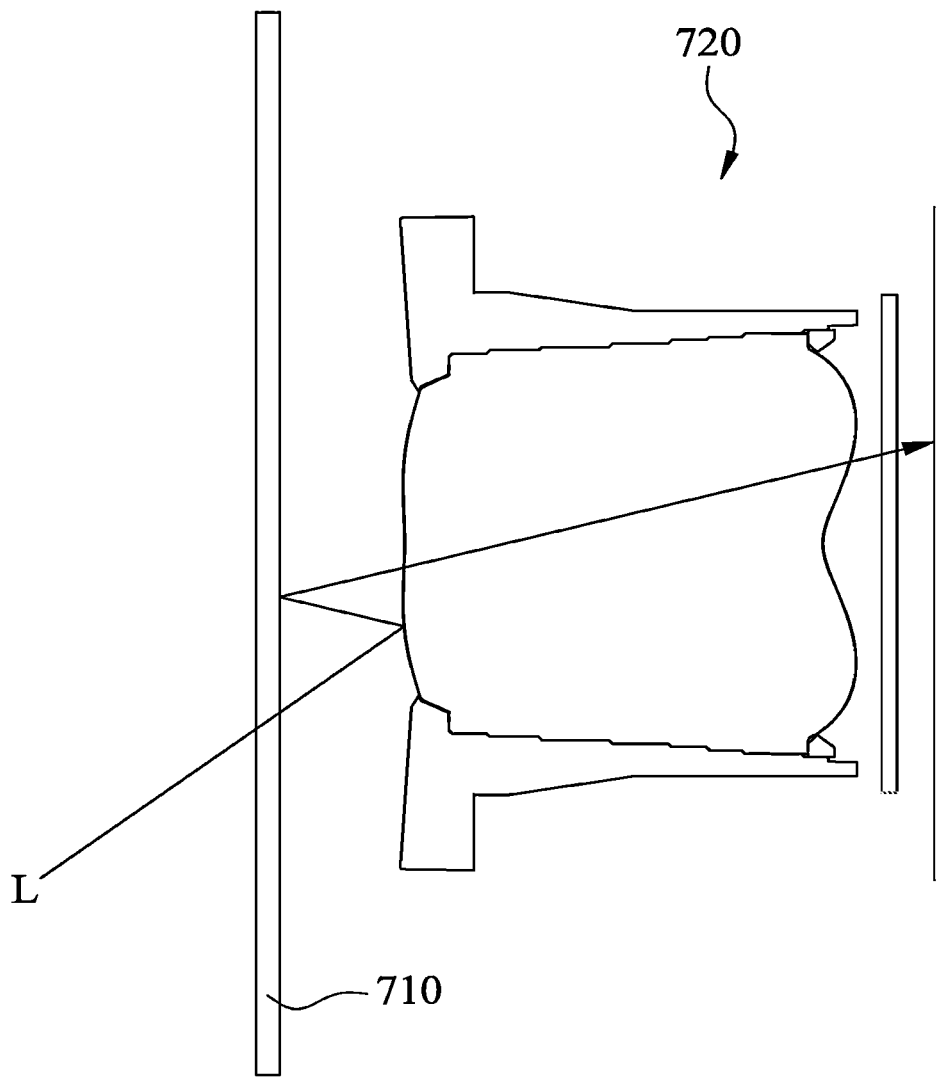
FIG. 7 is a schematic view of a light traveling through the optical component according to the prior art.

FIG. 6 is a three dimensional view of an electronic device 60 according to the 6th example of the present disclosure. In FIG. 6, the electronic device 60 can be a video capturing device, and the electronic device 60 includes a transparent element (its reference numeral is omitted), an optical component (its reference numeral is omitted) and an anti-reflecting layer 630, wherein the transparent element is configured to separate an inner side and an outer side of the electronic device 60, so that the light (not shown) passes through the transparent element to enter or leave the electronic device 60.

Moreover, the transparent element includes an inner side surface (its reference numeral is omitted) and an outer side surface (its reference numeral is omitted), wherein the inner side surface faces towards the inner side, the outer side surface faces towards the outer side, the optical component is corresponding to the inner side surface of the transparent element, and the anti-reflecting layer 630 is disposed on at least one portion of the inner side surface of the transparent element.

Furthermore, the electronic device 60 can further include a fill light module 61 and a focusing assisting module 62, and the electronic device 60 can be disposed on a computer monitor (its reference numeral is omitted).

Further, the disposition and the structural details of the transparent element, the optical component and the anti-reflecting layer according to the 6th example can be referred to the disposition and the structural details of the transparent element, the optical component and the anti-reflecting layer according to any one of the 1st example to the 3rd example, and hence will not be described again herein.

The foregoing description, for purpose of explanation, has been described with reference to specific examples. It is to be noted that Tables show different data of the different examples; however, the data of the different examples are obtained from experiments. The examples were chosen and described in order to best explain the principles of the disclosure and its practical applications, to thereby enable others skilled in the art to best utilize the disclosure and various examples with various modifications as are suited to the particular use contemplated. The examples depicted above and the appended drawings are exemplary and are not intended to be exhaustive or to limit the scope of the present disclosure to the precise forms disclosed. Many modifications and variations are possible in view of the above teachings.

What is claimed is:

1. An electronic device, comprising:

a transparent element configured to separate an inner side and an outer side of the electronic device, so that a light passing through the transparent element to enter or leave the electronic device, and the transparent element comprising:

an inner side surface; and an outer side surface, wherein the inner side surface faces towards the inner side, and the outer side surface faces towards the outer side;

an optical component corresponding to the inner side surface of the transparent element; and an anti-reflecting layer disposed on at least one portion of the inner side surface of the transparent element, and the anti-reflecting layer comprising:

a nanostructure layer comprising a plurality of ridge-like protrusions and a plurality of tapered ends, wherein the ridge-like protrusions extend non-directionally from a disposing surface, a bottom of each of the ridge-like protrusions is closer to the disposing surface than a top of each of the ridge-like protrusions to the disposing surface, and each of the ridge-like protrusions is tapered from the bottom towards the top; and a structure connection film comprising at least one silicon dioxide layer, wherein the structure connection film is substantially non-porous, and a top of the at least one silicon dioxide layer is directly contacted with a bottom of the nanostructure layer;

wherein a top of the structure connection film is partially covered by the nanostructure layer.

2. The electronic device of claim 1, wherein an average reflectivity of the at least one portion of the inner side surface of the transparent element corresponding to a light with a wavelength range between 400 nm and 700 nm is $R_{4070}$, and the following condition is satisfied:

$R_{4070} \le 0.5\%$.

3. The electronic device of claim 1, wherein an average reflectivity of the at least one portion of the inner side surface of the transparent element corresponding to a light with a wavelength range between 750 nm and 900 nm is $R_{7590}$, and the following condition is satisfied:

$R_{7590} \le 0.65\%$.

4. The electronic device of claim 1, wherein an average structural height of the nanostructure layer is larger than or equal to 70 nm and less than or equal to 350 nm.

5. The electronic device of claim 1, wherein the outer side surface comprises an anti-scratch layer.

6. The electronic device of claim 1, wherein the optical component is an imaging camera.

7. The electronic device of claim 6, wherein a spacing distance between the inner side surface and the optical component is D, and the following condition is satisfied:

$D \le 5$ mm.

8. The electronic device of claim 6, wherein the anti-reflecting layer is further disposed on the optical component.

9. The electronic device of claim 1, wherein the transparent element further comprises a light blocking structure.

10. The electronic device of claim 9, wherein a light-transmitting area is remained on the transparent element via the light blocking structure, and the light-transmitting area is corresponding to the optical component.

11. The electronic device of claim 1, wherein a number of the transparent element is at least two, a number of the optical component is at least two, and each of the transparent elements is corresponding to each of the optical components.

12. The electronic device of claim 11, wherein the inner side surface of one of the at least two transparent elements is non-planar.

13. The electronic device of claim 1, wherein a number of the optical component is at least two, and the at least two optical components are corresponding to the inner side surface of the transparent element.

14. The electronic device of claim 13, wherein one of the at least two optical components is an imaging camera, and the other one of the at least two optical components is a light-emitting element.

15. The electronic device of claim 13, wherein the at least two optical components are at least two imaging cameras, and a field of view of one of the at least two imaging cameras is different from a field of view of the other one of the at least two imaging cameras.

16. The electronic device of claim 13, wherein a corresponding working wavelength of one of the at least two optical components is different from a corresponding working wavelength of the other one of the at least two optical components.

17. The electronic device of claim 1, wherein the electronic device is a portable electronic device.

* * * * *